(12) United States Patent
Anderson

(10) Patent No.: US 8,175,908 B1
(45) Date of Patent: May 8, 2012

(54) SYSTEMS AND METHODS FOR CONSTRUCTING AND UTILIZING A MERCHANT DATABASE DERIVED FROM CUSTOMER PURCHASE TRANSACTIONS DATA

(75) Inventor: Russell Wayne Anderson, Avondale, PA (US)

(73) Assignee: JPMorgan Chase Bank, N.A., New York, NY (US)

(*) Notice: Subject to any disclaimer, the term of this patent is extended or adjusted under 35 U.S.C. 154(b) by 2075 days.

(21) Appl. No.: 10/933,462

(22) Filed: Sep. 3, 2004

Related U.S. Application Data

(60) Provisional application No. 60/499,728, filed on Sep. 4, 2003.

(51) Int. Cl.
G06F 17/60 (2006.01)
(52) U.S. Cl. .................................... 705/7.29
(58) Field of Classification Search .............. 705/10, 705/7, 7.29
See application file for complete search history.

(56) References Cited

U.S. PATENT DOCUMENTS

| | | |
|---|---|---|
| 1,245,531 A | 11/1917 | Tinsley |
| 2,152,079 A | 3/1939 | Mott |
| 2,986,144 A | 5/1961 | Shepard |
| 4,223,403 A | 9/1980 | Konheim et al. |
| 4,254,474 A | 3/1981 | Cooper et al. |
| 4,319,336 A | 3/1982 | Anderson et al. |
| 4,355,372 A | 10/1982 | Goldberg |
| 4,396,985 A | 8/1983 | Ohara |
| 4,567,359 A | 1/1986 | Lockwood |
| 4,605,820 A | 8/1986 | Campbell, Jr. |
| 4,641,239 A | 2/1987 | Takesako |
| 4,661,658 A | 4/1987 | Matyas |
| 4,713,760 A | 12/1987 | Yamada et al. |
| 4,723,212 A | 2/1988 | O'Brien |
| 4,745,468 A | 5/1988 | Von Kohorn |
| 4,750,036 A | 6/1988 | Martinez |
| 4,750,119 A | 6/1988 | Robertson |
| 4,752,676 A | 6/1988 | Leonard et al. |

(Continued)

FOREIGN PATENT DOCUMENTS

EP 0559313 6/1997
(Continued)

OTHER PUBLICATIONS

Morris (Effect of Wal-Mart Superstores on Local Market Food Retailing: Survival Strategies For the Small Grocer), Journal of Business and enterpreneurship.*

(Continued)

*Primary Examiner* — Romain Jeanty
(74) *Attorney, Agent, or Firm* — Hunton & Williams

(57) ABSTRACT

The invention relates to a method and system, including a computer system for storing and manipulating transaction data including transaction purchase information, customer demographics information, and merchant information, the computer system comprising a storage device for storing the transaction data and a processor for processing the transaction data. The method may include obtaining transaction purchase information generated from a plurality of sources; generating customer profile information based on the transaction purchase information; and obtaining merchant information relating to at least one merchant. The method may further include generating merchant profile information based on the merchant information and purchase transaction information; and processing the customer profile information and the merchant profile information in combination to generate business information; wherein the business information includes at least one selected from the group consisting of merchant profit information, merchant bankruptcy information, merchant revenue, merchant profit projections, and merchant market share.

33 Claims, 28 Drawing Sheets

U.S. PATENT DOCUMENTS

| | | |
|---|---|---|
| 4,760,604 A | 7/1988 | Cooper |
| 4,877,947 A | 10/1989 | Masu et al. |
| 4,882,675 A | 11/1989 | Nichtberger et al. |
| 4,891,503 A | 1/1990 | Jewell |
| 4,897,811 A | 1/1990 | Scofield |
| 4,906,826 A | 3/1990 | Spencer |
| 4,908,761 A | 3/1990 | Tai |
| 4,910,672 A | 3/1990 | Off |
| 4,926,255 A | 5/1990 | Von Kohorn |
| 4,958,375 A | 9/1990 | Reilly |
| 4,972,504 A | 11/1990 | Daniel, Jr. |
| 4,992,940 A | 2/1991 | Dworkin |
| 4,999,617 A | 3/1991 | Uemura |
| 5,023,782 A | 6/1991 | Lutz et al. |
| 5,025,372 A | 6/1991 | Burton et al. |
| 5,041,972 A | 8/1991 | Frost |
| 5,047,614 A | 9/1991 | Bianco |
| 5,056,019 A | 10/1991 | Schultz et al. |
| 5,117,355 A | 5/1992 | McCarthy |
| 5,122,950 A | 6/1992 | Mee |
| 5,128,752 A | 7/1992 | Von Kohorn |
| 5,173,589 A | 12/1992 | Diehl et al. |
| 5,173,851 A | 12/1992 | Off |
| 5,175,682 A | 12/1992 | Higashiyama |
| 5,201,010 A | 4/1993 | Gabriel |
| 5,202,826 A | 4/1993 | McCarthy |
| 5,220,501 A | 6/1993 | Lawlor |
| 5,231,569 A | 7/1993 | Myatt et al. |
| 5,233,514 A | 8/1993 | Ayyoubi |
| 5,233,654 A | 8/1993 | Harvey et al. |
| 5,237,620 A | 8/1993 | Deaton |
| 5,249,044 A | 9/1993 | Von Kohorn |
| 5,250,789 A | 10/1993 | Johnsen |
| 5,253,066 A | 10/1993 | Vogel |
| 5,259,018 A | 11/1993 | Grimmett et al. |
| 5,260,778 A | 11/1993 | Kauffman |
| 5,262,860 A | 11/1993 | Fitzpatrick |
| 5,265,008 A | 11/1993 | Benton et al. |
| 5,278,751 A | 1/1994 | Adiano |
| 5,285,278 A | 2/1994 | Holman |
| 5,287,181 A | 2/1994 | Holman |
| 5,287,268 A | 2/1994 | McCarthy |
| 5,297,026 A | 3/1994 | Hoffman |
| 5,305,196 A | 4/1994 | Deaton et al. |
| 5,311,594 A | 5/1994 | Penzias |
| 5,327,508 A | 7/1994 | Deaton et al. |
| 5,331,544 A | 7/1994 | Zhang |
| 5,343,239 A | 8/1994 | Lappington |
| 5,351,186 A | 9/1994 | Bullock |
| 5,380,991 A | 1/1995 | Valencia |
| 5,396,417 A | 3/1995 | Burks |
| RE34,915 E | 4/1995 | Nichtberger et al. |
| 5,428,684 A | 6/1995 | Akiyama et al. |
| 5,430,644 A | 7/1995 | Deaton et al. |
| 5,442,567 A | 8/1995 | Small |
| 5,444,844 A | 8/1995 | Inoue |
| 5,448,471 A | 9/1995 | Deaton et al. |
| 5,475,743 A | 12/1995 | Nixon et al. |
| 5,483,444 A | 1/1996 | Heintzeman et al. |
| 5,488,423 A | 1/1996 | Walkingshaw |
| 5,488,571 A | 1/1996 | Jacobs |
| 5,490,060 A | 2/1996 | Malec |
| 5,491,838 A | 2/1996 | Takahisa |
| 5,500,514 A | 3/1996 | Veeneman et al. |
| 5,500,681 A | 3/1996 | Jones |
| 5,500,890 A | 3/1996 | Rogge et al. |
| 5,504,519 A | 4/1996 | Remillard |
| 5,508,731 A | 4/1996 | Kohorn |
| 5,513,102 A | 4/1996 | Auriemma |
| 5,513,117 A | 4/1996 | Small |
| 5,521,363 A | 5/1996 | Tannenbaum |
| 5,523,794 A | 6/1996 | Mankovitz |
| 5,537,314 A | 7/1996 | Kanter |
| 5,539,825 A | 7/1996 | Akiyama et al. |
| 5,550,734 A | 8/1996 | Tarter |
| 5,551,021 A | 8/1996 | Harada |
| 5,559,313 A | 9/1996 | Claus et al. |
| 5,563,933 A | 10/1996 | August |
| 5,564,073 A | 10/1996 | Takahisa |
| 5,570,295 A | 10/1996 | Isenberg |
| 5,576,951 A | 11/1996 | Lockwood |
| 5,581,064 A | 12/1996 | Riley et al. |
| 5,594,493 A | 1/1997 | Nemirofsky |
| 5,603,025 A | 2/1997 | Tabb |
| 5,604,542 A | 2/1997 | Dedrick |
| 5,606,496 A | 2/1997 | D'Agostino |
| 5,612,868 A | 3/1997 | Off |
| 5,621,812 A | 4/1997 | Deaton et al. |
| 5,634,101 A | 5/1997 | Blau |
| 5,638,457 A | 6/1997 | Deaton et al. |
| 5,640,587 A | 6/1997 | Davis et al. |
| 5,642,279 A | 6/1997 | Stone |
| 5,642,485 A | 6/1997 | Deaton et al. |
| 5,644,723 A | 7/1997 | Deaton et al. |
| 5,649,114 A | 7/1997 | Deaton et al. |
| 5,652,602 A | 7/1997 | Fishman |
| 5,652,786 A | 7/1997 | Rogers |
| 5,659,469 A | 8/1997 | Deaton et al. |
| 5,664,115 A | 9/1997 | Fraser |
| 5,665,953 A | 9/1997 | Mazzamuto |
| 5,671,267 A | 9/1997 | August |
| 5,671,409 A | 9/1997 | Fatseas |
| 5,682,524 A | 10/1997 | Freund |
| 5,687,322 A | 11/1997 | Deaton et al. |
| 5,689,100 A | 11/1997 | Carrithers et al. |
| 5,704,044 A | 12/1997 | Tarter et al. |
| 5,710,886 A | 1/1998 | Christensen et al. |
| 5,710,889 A | 1/1998 | Clark et al. |
| 5,715,298 A | 2/1998 | Rogers |
| 5,715,402 A | 2/1998 | Popolo |
| 5,721,831 A | 2/1998 | Waits |
| 5,724,424 A | 3/1998 | Gifford |
| 5,727,163 A | 3/1998 | Bezos |
| 5,734,838 A | 3/1998 | Robinson et al. |
| 5,749,178 A | 5/1998 | Garmong |
| 5,758,328 A | 5/1998 | Giovannoli |
| 5,761,647 A | 6/1998 | Boushy |
| 5,761,661 A | 6/1998 | Coussenns |
| 5,765,142 A | 6/1998 | Allred et al. |
| 5,765,143 A | 6/1998 | Sheldon |
| 5,767,896 A | 6/1998 | Nemirofsky |
| 5,787,403 A | 7/1998 | Randle |
| 5,794,178 A | 8/1998 | Caid |
| 5,794,207 A | 8/1998 | Walker |
| 5,796,395 A | 8/1998 | De Hond |
| 5,806,044 A | 9/1998 | Powell |
| 5,806,045 A | 9/1998 | Biorge |
| 5,815,127 A | 9/1998 | Jacobs |
| 5,819,092 A | 10/1998 | Ferguson |
| 5,819,285 A | 10/1998 | Damico |
| 5,822,410 A | 10/1998 | McCausland et al. |
| 5,832,457 A | 11/1998 | O'Brien |
| 5,835,087 A | 11/1998 | Herz |
| 5,842,178 A | 11/1998 | Giovannoli |
| 5,845,259 A | 12/1998 | West et al. |
| 5,852,811 A | 12/1998 | Atkins |
| 5,855,008 A * | 12/1998 | Goldhaber et al. ............ 705/14 |
| 5,857,175 A | 1/1999 | Day |
| 5,861,906 A | 1/1999 | Dunn et al. |
| 5,862,223 A | 1/1999 | Walker |
| 5,870,456 A | 2/1999 | Rogers |
| 5,870,721 A | 2/1999 | Norris |
| 5,870,724 A | 2/1999 | Lawlor |
| 5,873,096 A | 2/1999 | Lim |
| 5,884,278 A | 3/1999 | Powell |
| 5,887,271 A | 3/1999 | Powell |
| 5,890,135 A | 3/1999 | Powell |
| 5,899,982 A | 5/1999 | Randle |
| 5,918,214 A | 6/1999 | Perkowski |
| 5,930,217 A | 7/1999 | Kayanuma |
| 5,930,764 A | 7/1999 | Melchione |
| 5,933,812 A | 8/1999 | Meyer et al. |
| 5,940,811 A | 8/1999 | Norris |
| 5,940,815 A | 8/1999 | Maeda et al. |
| 5,949,044 A | 9/1999 | Walker et al. |
| 5,950,173 A | 9/1999 | Perkowski |
| 5,964,839 A | 10/1999 | Johnson et al. |

| Patent No. | Date | Inventor |
|---|---|---|
| 5,970,467 A | 10/1999 | Alavi |
| 5,970,469 A | 10/1999 | Scroggie et al. |
| 5,970,480 A | 10/1999 | Kalina |
| 5,974,396 A * | 10/1999 | Anderson et al. ............... 705/10 |
| 5,987,434 A | 11/1999 | Libman |
| 5,991,736 A | 11/1999 | Ferguson et al. |
| 5,995,942 A | 11/1999 | Smith et al. |
| 6,006,205 A | 12/1999 | Loeb et al. |
| 6,009,239 A | 12/1999 | Morita et al. |
| 6,009,411 A | 12/1999 | Kepecs |
| 6,009,415 A | 12/1999 | Shurling et al. |
| 6,012,049 A | 1/2000 | Kawan |
| 6,014,634 A | 1/2000 | Scroggie et al. |
| 6,014,645 A | 1/2000 | Cunningham |
| 6,014,647 A | 1/2000 | Nizzari et al. |
| 6,018,718 A | 1/2000 | Walker et al. |
| 6,026,370 A | 2/2000 | Jermyn |
| 6,029,139 A | 2/2000 | Cunningham et al. |
| 6,029,153 A | 2/2000 | Bauchner et al. |
| 6,029,195 A | 2/2000 | Herz |
| 6,032,125 A | 2/2000 | Ando |
| 6,032,136 A | 2/2000 | Brake, Jr. et al. |
| 6,055,510 A | 4/2000 | Henrick |
| 6,055,513 A | 4/2000 | Katz et al. |
| 6,061,658 A | 5/2000 | Chou et al. |
| 6,070,147 A | 5/2000 | Harms et al. |
| 6,073,105 A | 6/2000 | Sutcliffe et al. |
| 6,076,072 A | 6/2000 | Libman |
| 6,078,891 A | 6/2000 | Riordan et al. |
| 6,078,892 A | 6/2000 | Anderson et al. |
| 6,105,007 A | 8/2000 | Norris |
| 6,108,642 A | 8/2000 | Findley |
| 6,119,933 A | 9/2000 | Wong et al. |
| 6,128,599 A | 10/2000 | Walker et al. |
| 6,133,914 A | 10/2000 | Rogers et al. |
| 6,134,532 A | 10/2000 | Lazarus et al. |
| 6,141,666 A | 10/2000 | Tobin |
| 6,161,128 A | 12/2000 | Smyk |
| 6,169,974 B1 | 1/2001 | Baumgartner et al. |
| 6,178,408 B1 | 1/2001 | Copple et al. |
| 6,182,059 B1 | 1/2001 | Angotti et al. |
| 6,185,541 B1 | 2/2001 | Scroggie et al. |
| 6,189,787 B1 | 2/2001 | Dorf |
| 6,195,644 B1 | 2/2001 | Bowie |
| 6,216,129 B1 | 4/2001 | Eldering |
| 6,222,914 B1 | 4/2001 | McMullin |
| 6,236,978 B1 | 5/2001 | Tuzhilin |
| 6,243,688 B1 | 6/2001 | Kalina |
| 6,243,689 B1 | 6/2001 | Norton |
| 6,267,292 B1 | 7/2001 | Walker et al. |
| 6,278,996 B1 | 8/2001 | Richardson et al. |
| 6,282,516 B1 | 8/2001 | Giuliani |
| 6,289,324 B1 | 9/2001 | Kawan |
| 6,292,786 B1 | 9/2001 | Deaton et al. |
| 6,298,348 B1 | 10/2001 | Eldering |
| 6,324,524 B1 | 11/2001 | Lent et al. |
| 6,327,573 B1 | 12/2001 | Walker et al. |
| 6,327,574 B1 | 12/2001 | Kramer et al. |
| 6,330,543 B1 | 12/2001 | Kepecs |
| 6,332,126 B1 | 12/2001 | Peirce et al. |
| 6,334,108 B1 | 12/2001 | Deaton et al. |
| 6,334,131 B2 | 12/2001 | Chakrabarti et al. |
| 6,344,108 B1 | 2/2002 | Von Medvey et al. |
| 6,349,290 B1 | 2/2002 | Horowitz et al. |
| 6,351,735 B1 | 2/2002 | Deaton et al. |
| 6,356,881 B1 | 3/2002 | Milch et al. |
| 6,360,209 B1 | 3/2002 | Loeb et al. |
| 6,377,935 B1 | 4/2002 | Deaton et al. |
| 6,377,936 B1 | 4/2002 | Henrick et al. |
| 6,404,866 B1 | 6/2002 | Hopper et al. |
| 6,405,175 B1 | 6/2002 | Ng |
| 6,405,181 B2 | 6/2002 | Lent et al. |
| 6,409,080 B2 | 6/2002 | Kawagishi |
| 6,411,947 B1 | 6/2002 | Rice et al. |
| 6,424,947 B1 | 7/2002 | Tsuria et al. |
| 6,424,949 B1 | 7/2002 | Deaton et al. |
| 6,424,951 B1 | 7/2002 | Shurling et al. |
| 6,430,539 B1 | 8/2002 | Lazarus et al. |
| 6,434,534 B1 | 8/2002 | Walker et al. |
| 6,473,740 B2 * | 10/2002 | Cockrill et al. ............... 705/27 |
| 6,476,830 B1 | 11/2002 | Farmer et al. |
| 6,477,509 B1 | 11/2002 | Hammons et al. |
| 6,484,146 B2 | 11/2002 | Day et al. |
| 6,487,539 B1 | 11/2002 | Aggarwal et al. |
| 6,505,168 B1 | 1/2003 | Rothman et al. |
| 6,513,019 B2 | 1/2003 | Lewis |
| 6,516,302 B1 | 2/2003 | Deaton et al. |
| 6,519,572 B1 | 2/2003 | Riordan et al. |
| 6,535,855 B1 | 3/2003 | Cahill et al. |
| 6,564,189 B1 | 5/2003 | Nycz |
| 6,567,791 B2 | 5/2003 | Lent et al. |
| 6,571,216 B1 | 5/2003 | Garg et al. |
| 6,578,012 B1 | 6/2003 | Storey |
| 6,587,835 B1 | 7/2003 | Treyz et al. |
| 6,594,640 B1 | 7/2003 | Postrel |
| 6,609,104 B1 | 8/2003 | Deaton et al. |
| 6,611,811 B1 | 8/2003 | Deaton et al. |
| 6,611,819 B1 | 8/2003 | Oneda |
| 6,647,376 B1 | 11/2003 | Farrar et al. |
| 6,662,215 B1 | 12/2003 | Moskowitz et al. |
| 6,684,195 B1 | 1/2004 | Deaton et al. |
| 6,714,919 B1 | 3/2004 | Findley |
| 6,718,313 B1 | 4/2004 | Lent et al. |
| 6,721,743 B1 | 4/2004 | Sakakibara |
| 6,735,778 B2 | 5/2004 | Khoo et al. |
| 6,754,640 B2 | 6/2004 | Bozeman |
| 6,795,809 B2 | 9/2004 | O'Brien et al. |
| 6,795,812 B1 | 9/2004 | Lent et al. |
| 6,804,786 B1 | 10/2004 | Chamley et al. |
| 6,817,008 B2 | 11/2004 | Leford et al. |
| 6,819,748 B2 | 11/2004 | Matada |
| 6,820,061 B2 | 11/2004 | Postrel |
| 6,829,586 B2 | 12/2004 | Postrel |
| 6,842,739 B2 | 1/2005 | Postrel |
| 6,865,547 B1 | 3/2005 | Brake, Jr. et al. |
| 6,874,139 B2 | 3/2005 | Krueger et al. |
| 6,885,994 B1 | 4/2005 | Scroggie et al. |
| 6,886,046 B2 | 4/2005 | Stutz et al. |
| 6,889,198 B2 | 5/2005 | Kawan |
| 6,892,187 B2 | 5/2005 | Phillips et al. |
| 6,901,375 B2 | 5/2005 | Fernandez |
| 6,901,406 B2 | 5/2005 | Nabe et al. |
| 6,915,271 B1 | 7/2005 | Meyer et al. |
| 6,920,611 B1 | 7/2005 | Spaeth et al. |
| 6,938,156 B2 | 8/2005 | Wheeler et al. |
| RE38,801 E | 9/2005 | Rogers |
| 6,945,453 B1 | 9/2005 | Schwarz Jr. |
| 6,947,898 B2 | 9/2005 | Postrel |
| 6,950,940 B2 | 9/2005 | Wheeler et al. |
| 6,963,857 B1 | 11/2005 | Johnson |
| 6,970,830 B1 | 11/2005 | Samra et al. |
| 6,985,879 B2 | 1/2006 | Walker et al. |
| 6,996,572 B1 | 2/2006 | Chakrabarti et al. |
| 6,999,938 B1 | 2/2006 | Libman |
| 7,003,476 B1 | 2/2006 | Samra et al. |
| 7,006,979 B1 | 2/2006 | Samra et al. |
| 7,010,495 B1 | 3/2006 | Samra et al. |
| 7,024,374 B1 | 4/2006 | Day et al. |
| 7,072,864 B2 | 7/2006 | Brake, Jr. et al. |
| 7,090,138 B2 | 8/2006 | Rettenmyer et al. |
| 7,092,905 B2 | 8/2006 | Behrenbrinker et al. |
| 7,121,471 B2 | 10/2006 | Beenau et al. |
| 7,143,063 B2 | 11/2006 | Lent et al. |
| 7,155,402 B1 | 12/2006 | Dvorak |
| 7,249,097 B2 | 7/2007 | Hutchison et al. |
| 7,249,099 B2 | 7/2007 | Ling |
| 7,266,835 B2 | 9/2007 | Halbert |
| 7,313,802 B1 | 12/2007 | Tomsen |
| 7,315,826 B1 * | 1/2008 | Guheen et al. ............... 705/7 |
| 7,333,948 B2 | 2/2008 | Bell et al. |
| 7,349,866 B2 | 3/2008 | Schwarz, Jr. |
| 7,356,516 B2 | 4/2008 | Richey et al. |
| 7,376,618 B1 | 5/2008 | Anderson et al. |
| 7,467,096 B2 | 12/2008 | Antonucci et al. |
| 7,493,636 B2 | 2/2009 | Kitsukawa et al. |
| 7,523,385 B2 | 4/2009 | Nguyen et al. |
| 7,580,857 B2 | 8/2009 | VanFleet et al. |
| 7,587,363 B2 | 9/2009 | Cataline et al. |

| | | |
|---|---|---|
| 7,613,629 B2 | 11/2009 | Antonucci et al. |
| 7,630,935 B2 | 12/2009 | Loeger et al. |
| 7,640,205 B2 | 12/2009 | Michelassi et al. |
| 7,644,102 B2 | 1/2010 | Gaussier et al. |
| 7,689,504 B2 | 3/2010 | Warren et al. |
| 7,707,111 B2 | 4/2010 | Brake, Jr. et al. |
| 7,729,925 B2 | 6/2010 | Maritzen et al. |
| 7,729,980 B2 | 6/2010 | Mittenzwei et al. |
| 2001/0014868 A1 | 8/2001 | Herz et al. |
| 2001/0023407 A1 | 9/2001 | Liyanearachchi et al. |
| 2001/0025253 A1 | 9/2001 | Heintz et al. |
| 2001/0029490 A1 | 10/2001 | Inamochi |
| 2001/0034651 A1 | 10/2001 | Marks et al. |
| 2001/0034663 A1 | 10/2001 | Teveler et al. |
| 2001/0034718 A1 | 10/2001 | Shaked et al. |
| 2001/0037243 A1 | 11/2001 | Rouston et al. |
| 2001/0037299 A1 | 11/2001 | Nichols et al. |
| 2001/0039511 A1 | 11/2001 | Duckworth et al. |
| 2001/0044764 A1 | 11/2001 | Arnold |
| 2001/0047342 A1 | 11/2001 | Cuervo |
| 2001/0049628 A1 | 12/2001 | Icho |
| 2001/0054003 A1 | 12/2001 | Chien et al. |
| 2002/0002495 A1 | 1/2002 | Ullman |
| 2002/0004742 A1 | 1/2002 | Willcocks et al. |
| 2002/0007313 A1 | 1/2002 | Mai et al. |
| 2002/0010621 A1 | 1/2002 | Bell et al. |
| 2002/0011517 A1 | 1/2002 | Namekawa et al. |
| 2002/0013728 A1 | 1/2002 | Wilkman |
| 2002/0023051 A1 | 2/2002 | Kunzle et al. |
| 2002/0026365 A1 | 2/2002 | Natanzon |
| 2002/0026394 A1 | 2/2002 | Savage et al. |
| 2002/0032622 A1 | 3/2002 | Petit et al. |
| 2002/0040344 A1 | 4/2002 | Preiser et al. |
| 2002/0042742 A1 | 4/2002 | Glover et al. |
| 2002/0042774 A1 | 4/2002 | Ortiz et al. |
| 2002/0046110 A1 | 4/2002 | Gallagher |
| 2002/0046116 A1 | 4/2002 | Hohle et al. |
| 2002/0049605 A1 | 4/2002 | Hagi |
| 2002/0049626 A1 | 4/2002 | Mathias et al. |
| 2002/0052778 A1 | 5/2002 | Murphy et al. |
| 2002/0052782 A1* | 5/2002 | Landesmann .................. 705/14 |
| 2002/0055874 A1 | 5/2002 | Cohen |
| 2002/0059103 A1 | 5/2002 | Anderson et al. |
| 2002/0062253 A1 | 5/2002 | Dosh et al. |
| 2002/0062257 A1 | 5/2002 | Minamishin et al. |
| 2002/0065735 A1 | 5/2002 | Hatakama et al. |
| 2002/0069104 A1 | 6/2002 | Beach et al. |
| 2002/0069109 A1 | 6/2002 | Wendkos |
| 2002/0069158 A1 | 6/2002 | Larkin et al. |
| 2002/0070270 A1 | 6/2002 | Narita et al. |
| 2002/0072931 A1 | 6/2002 | Card |
| 2002/0072974 A1 | 6/2002 | Pugliese et al. |
| 2002/0073019 A1 | 6/2002 | Deaton |
| 2002/0077890 A1 | 6/2002 | LaPointe et al. |
| 2002/0077895 A1 | 6/2002 | Howell |
| 2002/0077904 A1 | 6/2002 | Ali |
| 2002/0077966 A1 | 6/2002 | Harycki et al. |
| 2002/0082920 A1 | 6/2002 | Austin et al. |
| 2002/0082962 A1 | 6/2002 | Farris et al. |
| 2002/0087349 A1 | 7/2002 | Wong |
| 2002/0091567 A1 | 7/2002 | Royston |
| 2002/0099601 A1 | 7/2002 | Farrell |
| 2002/0099649 A1 | 7/2002 | Lee et al. |
| 2002/0107731 A1 | 8/2002 | Teng |
| 2002/0111859 A1 | 8/2002 | Sheldon et al. |
| 2002/0111860 A1 | 8/2002 | Jones |
| 2002/0111861 A1 | 8/2002 | Sakamoto et al. |
| 2002/0111891 A1 | 8/2002 | Hoffman et al. |
| 2002/0116266 A1 | 8/2002 | Marshall |
| 2002/0116331 A1 | 8/2002 | Cataline et al. |
| 2002/0120497 A1 | 8/2002 | King |
| 2002/0120571 A1 | 8/2002 | Maung et al. |
| 2002/0120846 A1 | 8/2002 | Stewart et al. |
| 2002/0123926 A1 | 9/2002 | Bushold et al. |
| 2002/0123946 A1 | 9/2002 | Haworth et al. |
| 2002/0123955 A1 | 9/2002 | Andreski et al. |
| 2002/0128916 A1 | 9/2002 | Beinecke |
| 2002/0133401 A1 | 9/2002 | Mount et al. |
| 2002/0143614 A1 | 10/2002 | MacLean et al. |
| 2002/0143621 A1 | 10/2002 | Donnelly et al. |
| 2002/0143626 A1 | 10/2002 | Voltmer et al. |
| 2002/0147633 A1 | 10/2002 | Rafizadeh |
| 2002/0147691 A1 | 10/2002 | Davis et al. |
| 2002/0152116 A1 | 10/2002 | Yan et al. |
| 2002/0152118 A1 | 10/2002 | Hadjigeorgis |
| 2002/0152123 A1 | 10/2002 | Giordano et al. |
| 2002/0152179 A1 | 10/2002 | Racov |
| 2002/0161630 A1 | 10/2002 | Kern et al. |
| 2002/0161641 A1 | 10/2002 | Quinlan et al. |
| 2002/0165808 A1 | 11/2002 | Zamsky et al. |
| 2002/0169671 A1 | 11/2002 | Junger |
| 2002/0174011 A1 | 11/2002 | Sanchez et al. |
| 2002/0178056 A1 | 11/2002 | Lim |
| 2002/0178112 A1 | 11/2002 | Goeller et al. |
| 2002/0188478 A1 | 12/2002 | Breeland et al. |
| 2002/0188509 A1 | 12/2002 | Ariff et al. |
| 2002/0188511 A1 | 12/2002 | Johnson et al. |
| 2002/0188565 A1 | 12/2002 | Nakamura et al. |
| 2002/0194071 A1 | 12/2002 | Yoshizaki et al. |
| 2002/0194119 A1 | 12/2002 | Wright et al. |
| 2002/0198803 A1 | 12/2002 | Rowe |
| 2002/0198807 A1 | 12/2002 | Kobayashi et al. |
| 2003/0004794 A1 | 1/2003 | Hamilton |
| 2003/0004803 A1 | 1/2003 | Glover et al. |
| 2003/0004809 A1 | 1/2003 | Palcic et al. |
| 2003/0005288 A1 | 1/2003 | Moskowitz et al. |
| 2003/0009374 A1 | 1/2003 | Moodie et al. |
| 2003/0009379 A1 | 1/2003 | Narasimhan et al. |
| 2003/0009393 A1 | 1/2003 | Norris |
| 2003/0018523 A1 | 1/2003 | Rappaport et al. |
| 2003/0018550 A1* | 1/2003 | Rotman et al. .................. 705/35 |
| 2003/0020744 A1 | 1/2003 | Ellis et al. |
| 2003/0023492 A1 | 1/2003 | Riordan et al. |
| 2003/0023557 A1 | 1/2003 | Moore |
| 2003/0033252 A1 | 2/2003 | Buttridge et al. |
| 2003/0036952 A1 | 2/2003 | Panttaja et al. |
| 2003/0040964 A1 | 2/2003 | Lacek |
| 2003/0046173 A1 | 3/2003 | Benjier et al. |
| 2003/0048888 A1 | 3/2003 | Hopper et al. |
| 2003/0050831 A1 | 3/2003 | Klayh |
| 2003/0061093 A1 | 3/2003 | Todd |
| 2003/0061097 A1 | 3/2003 | Walker et al. |
| 2003/0061098 A1 | 3/2003 | Meyer |
| 2003/0065618 A1 | 4/2003 | VanDeboe, Jr. |
| 2003/0069808 A1 | 4/2003 | Cardno |
| 2003/0083933 A1 | 5/2003 | McAlear |
| 2003/0088460 A1 | 5/2003 | Riordan et al. |
| 2003/0088462 A1 | 5/2003 | Carrither et al. |
| 2003/0088470 A1 | 5/2003 | Cuervo |
| 2003/0097298 A1 | 5/2003 | Klimpl et al. |
| 2003/0101454 A1 | 5/2003 | Ozer et al. |
| 2003/0105688 A1 | 6/2003 | Brown et al. |
| 2003/0105689 A1 | 6/2003 | Chandak et al. |
| 2003/0115100 A1 | 6/2003 | Teicher |
| 2003/0120544 A1 | 6/2003 | Gritzbach et al. |
| 2003/0125969 A1 | 7/2003 | Kizer et al. |
| 2003/0126011 A1 | 7/2003 | Bryman et al. |
| 2003/0131357 A1 | 7/2003 | Kim |
| 2003/0144902 A1 | 7/2003 | Bowie |
| 2003/0149629 A1 | 8/2003 | Claridge et al. |
| 2003/0158776 A1 | 8/2003 | Landesmann |
| 2003/0158782 A1 | 8/2003 | Thomson et al. |
| 2003/0158818 A1 | 8/2003 | George et al. |
| 2003/0171992 A1 | 9/2003 | Blagg et al. |
| 2003/0182194 A1 | 9/2003 | Choey et al. |
| 2003/0195805 A1 | 10/2003 | Storey |
| 2003/0200141 A1 | 10/2003 | Robison |
| 2003/0200142 A1 | 10/2003 | Hicks et al. |
| 2003/0205617 A1 | 11/2003 | Allen et al. |
| 2003/0208323 A1 | 11/2003 | Hao et al. |
| 2003/0208400 A1 | 11/2003 | Kuo et al. |
| 2003/0208439 A1 | 11/2003 | Rast |
| 2003/0212630 A1 | 11/2003 | Kahr |
| 2003/0216964 A1 | 11/2003 | MacLean et al. |
| 2003/0216965 A1 | 11/2003 | Libman |
| 2003/0216967 A1 | 11/2003 | Williams |
| 2003/0216998 A1 | 11/2003 | Chang et al. |
| 2003/0217003 A1 | 11/2003 | Weinflash et al. |

| Pub. No. | Date | Inventor | Pub. No. | Date | Inventor |
|---|---|---|---|---|---|
| 2003/0220834 A1 | 11/2003 | Leung et al. | 2005/0125351 A1 | 6/2005 | Tidwell et al. |
| 2003/0225618 A1 | 12/2003 | Hessburg et al. | 2005/0125360 A1 | 6/2005 | Tidwell et al. |
| 2003/0225619 A1 | 12/2003 | Dokken et al. | 2005/0131761 A1 | 6/2005 | Trika et al. |
| 2003/0229590 A1 | 12/2003 | Byrne et al. | 2005/0131792 A1 | 6/2005 | Rowe |
| 2003/0233255 A1 | 12/2003 | Dirienzo | 2005/0137982 A1 | 6/2005 | Michelassi et al. |
| 2003/0233278 A1 | 12/2003 | Marshall | 2005/0144071 A1 | 6/2005 | Monahan et al. |
| 2003/0233339 A1 | 12/2003 | Downs | 2005/0144074 A1 | 6/2005 | Fredregill et al. |
| 2003/0236712 A1 | 12/2003 | Antonucci et al. | 2005/0144105 A1 | 6/2005 | Czyzewski |
| 2004/0002916 A1 | 1/2004 | Timmerman et al. | 2005/0144143 A1 | 6/2005 | Freiberg |
| 2004/0006487 A1 | 1/2004 | Tari | 2005/0149386 A1 | 7/2005 | Agura et al. |
| 2004/0010447 A1 | 1/2004 | Asayama | 2005/0149393 A1 | 7/2005 | Leof |
| 2004/0010462 A1 | 1/2004 | Moon et al. | 2005/0149440 A1 | 7/2005 | Michelassi et al. |
| 2004/0015394 A1 | 1/2004 | Mok et al. | 2005/0154664 A1 | 7/2005 | Guy et al. |
| 2004/0030626 A1 | 2/2004 | Libman | 2005/0159986 A1 | 7/2005 | Breeland et al. |
| 2004/0030667 A1 | 2/2004 | Xu et al. | 2005/0160003 A1 | 7/2005 | Berardi et al. |
| 2004/0039588 A1 | 2/2004 | Libman | 2005/0160051 A1 | 7/2005 | Johnson |
| 2004/0039686 A1 | 2/2004 | Klebanoff | 2005/0167342 A1 | 8/2005 | Vullriede et al. |
| 2004/0044606 A1 | 3/2004 | Buttridge et al. | 2005/0171839 A1 | 8/2005 | Corriere |
| 2004/0064401 A1 | 4/2004 | Palaghita et al. | 2005/0171842 A1 | 8/2005 | Tien et al. |
| 2004/0078324 A1 | 4/2004 | Lonnberg et al. | 2005/0171901 A1 | 8/2005 | Rosenblatt et al. |
| 2004/0078328 A1 | 4/2004 | Talbert et al. | 2005/0177503 A1 | 8/2005 | Thomas |
| 2004/0078332 A1 | 4/2004 | Ferguson et al. | 2005/0177523 A1 | 8/2005 | Weiss et al. |
| 2004/0107125 A1 | 6/2004 | Guheen et al. | 2005/0182654 A1 | 8/2005 | Abolfathi et al. |
| 2004/0111363 A1 | 6/2004 | Trench et al. | 2005/0182735 A1 | 8/2005 | Zager et al. |
| 2004/0111371 A1 | 6/2004 | Friedman | 2005/0187820 A1 | 8/2005 | Mohan |
| 2004/0128248 A1 | 7/2004 | Fujihara et al. | 2005/0192862 A1 | 9/2005 | Modi |
| 2004/0138991 A1 | 7/2004 | Song et al. | 2005/0197904 A1 | 9/2005 | Baron et al. |
| 2004/0143526 A1 | 7/2004 | Monasterio et al. | 2005/0199708 A1 | 9/2005 | Friedman |
| 2004/0172358 A1 | 9/2004 | Lent et al. | 2005/0203824 A1 | 9/2005 | Freud et al. |
| 2004/0177036 A1 | 9/2004 | Nutahara et al. | 2005/0203857 A1 | 9/2005 | Friedman |
| 2004/0181441 A1 | 9/2004 | Fung et al. | 2005/0205666 A1 | 9/2005 | Ward et al. |
| 2004/0186773 A1 | 9/2004 | George et al. | 2005/0209917 A1 | 9/2005 | Anderson et al. |
| 2004/0193540 A1 | 9/2004 | Brown et al. | 2005/0216346 A1 | 9/2005 | Kusumoto et al. |
| 2004/0199406 A1 | 10/2004 | Owens et al. | 2005/0222906 A1 | 10/2005 | Chen |
| 2004/0210498 A1 | 10/2004 | Freund | 2005/0234769 A1 | 10/2005 | Jain et al. |
| 2004/0210531 A1 | 10/2004 | Barron et al. | 2005/0234773 A1 | 10/2005 | Hirst et al. |
| 2004/0215507 A1 | 10/2004 | Levitt et al. | 2005/0234789 A1 | 10/2005 | Czyzewski et al. |
| 2004/0236688 A1 | 11/2004 | Bozeman | 2005/0240474 A1 | 10/2005 | Li |
| 2004/0243468 A1 | 12/2004 | Cohagan et al. | 2005/0240477 A1 | 10/2005 | Friday et al. |
| 2004/0243506 A1 | 12/2004 | Das | 2005/0242179 A1 | 11/2005 | Warwick |
| 2004/0249689 A1 | 12/2004 | Naraki et al. | 2005/0246289 A1 | 11/2005 | Alexander et al. |
| 2004/0249710 A1 | 12/2004 | Smith et al. | 2005/0246627 A1 | 11/2005 | Sayed |
| 2004/0249712 A1 | 12/2004 | Brown et al. | 2005/0251446 A1 | 11/2005 | Jiang et al. |
| 2004/0249764 A1 | 12/2004 | Delizt et al. | 2005/0251470 A1 | 11/2005 | Sullivan |
| 2005/0004839 A1 | 1/2005 | Bakker et al. | 2005/0256759 A1 * | 11/2005 | Acharya et al. .................. 705/10 |
| 2005/0004864 A1 | 1/2005 | Lent et al. | 2005/0256794 A1 | 11/2005 | Colby |
| 2005/0006286 A1 | 1/2005 | Fery et al. | 2005/0256802 A1 | 11/2005 | Ammermann et al. |
| 2005/0021363 A1 | 1/2005 | Stimson et al. | 2005/0261916 A1 | 11/2005 | McCall et al. |
| 2005/0021405 A1 | 1/2005 | Agarwal | 2005/0261995 A1 | 11/2005 | Phelan |
| 2005/0021457 A1 | 1/2005 | Johnson et al. | 2005/0267800 A1 | 12/2005 | Tietzen et al. |
| 2005/0023346 A1 | 2/2005 | Bakker et al. | 2005/0273386 A1 | 12/2005 | Weidner |
| 2005/0033637 A1 | 2/2005 | Underwood | 2005/0273387 A1 | 12/2005 | Previdi |
| 2005/0049965 A1 | 3/2005 | Jen | 2005/0273425 A1 | 12/2005 | Yamazaki |
| 2005/0055270 A1 | 3/2005 | Broe | 2005/0278215 A1 | 12/2005 | Seele, Jr |
| 2005/0065877 A1 | 3/2005 | Cleary et al. | 2005/0283429 A1 | 12/2005 | Bates et al. |
| 2005/0071225 A1 | 3/2005 | Bortolin et al. | 2005/0288998 A1 | 12/2005 | Verma et al. |
| 2005/0071226 A1 | 3/2005 | Nguyen et al. | 2005/0289003 A1 | 12/2005 | Thompson et al. |
| 2005/0071227 A1 | 3/2005 | Hammad et al. | 2006/0004629 A1 | 1/2006 | Neemann et al. |
| 2005/0075889 A1 | 4/2005 | Gomes et al. | 2006/0010033 A1 | 1/2006 | Thomas |
| 2005/0080672 A1 | 4/2005 | Courtion et al. | 2006/0010034 A1 | 1/2006 | Sparks |
| 2005/0086103 A1 | 4/2005 | Agura et al. | 2006/0011719 A1 | 1/2006 | Lehtonen et al. |
| 2005/0086166 A1 | 4/2005 | Monk et al. | 2006/0015463 A1 | 1/2006 | Gupta et al. |
| 2005/0091104 A1 | 4/2005 | Abraham | 2006/0020507 A1 | 1/2006 | Sagey |
| 2005/0091138 A1 | 4/2005 | Awatsu | 2006/0026073 A1 | 2/2006 | Kenny et al. |
| 2005/0096976 A1 | 5/2005 | Nelms | 2006/0031718 A1 | 2/2006 | Thornhill et al. |
| 2005/0097033 A1 | 5/2005 | Pretell et al. | 2006/0036553 A1 | 2/2006 | Gupta et al. |
| 2005/0102178 A1 | 5/2005 | Phillips et al. | 2006/0064329 A1 | 3/2006 | Abolfathi et al. |
| 2005/0108090 A1 | 5/2005 | Takeda et al. | 2006/0080230 A1 | 4/2006 | Freiberg |
| 2005/0108102 A1 | 5/2005 | York | 2006/0080243 A1 | 4/2006 | Kemper et al. |
| 2005/0108151 A1 | 5/2005 | York | 2006/0080254 A1 | 4/2006 | Chigira et al. |
| 2005/0119938 A1 | 6/2005 | Smith et al. | 2006/0095350 A1 | 5/2006 | Hall et al. |
| 2005/0125292 A1 | 6/2005 | Kassab et al. | 2006/0136306 A1 | 6/2006 | Rothman et al. |
| 2005/0125295 A1 | 6/2005 | Tidwell et al. | 2006/0143077 A1 | 6/2006 | Prorock |
| 2005/0125296 A1 | 6/2005 | Tidwell et al. | 2006/0143117 A1 | 6/2006 | Chigira et al. |
| 2005/0125315 A1 | 6/2005 | Munoz et al. | 2006/0149671 A1 | 7/2006 | Nix et al. |
| 2005/0125337 A1 | 6/2005 | Tidwell et al. | 2007/0156521 A1 | 7/2007 | Yates |
| 2005/0125338 A1 | 6/2005 | Tidwell et al. | 2007/0186252 A1 | 8/2007 | Maggio |
| 2005/0125339 A1 | 6/2005 | Tidwell et al. | 2007/0260521 A1 * | 11/2007 | Van Der Riet .................. 705/14 |
| 2005/0125350 A1 | 6/2005 | Tidwell et al. | 2008/0184315 A1 | 7/2008 | Ellis et al. |

| | | |
|---|---|---|
| 2008/0255986 A1 | 10/2008 | Scarborough et al. |
| 2009/0132347 A1 | 5/2009 | Anderson et al. |
| 2009/0150937 A1 | 6/2009 | Ellis et al. |

FOREIGN PATENT DOCUMENTS

| | | |
|---|---|---|
| WO | WO 01/11532 | 2/2001 |

OTHER PUBLICATIONS

Spring et al (The Combination Strategy to Optimal Target Selection and Offer Segmentation in Direct Mail), Journal of Market Focussed Management, pp. 1-17.*

Ristad, A Natural Law of Succession, Research Report CS-TR-495-95, May 1995, Revised Jul. 1995, 1-24.

Kalman, A New Approach to Linear Filtering and Prediction Problems, Journal of Basic Engineering, 82 (Series D): 35-45, 1960.

White, A Reality Check for Data Snooping, Econometrica, vol. 68, No. 5, 1097-1126, Sep. 2000.

Bell et al., An information-maximisation approach to blind separation and blind deconvolution, Neural Computation 7, 6, 1004-1034, 1995.

Cybenko, Approximation by Superpositions of a Sigmoidal Function, Oct. 24, 1988.

Quinlan, Bagging, Boosting, and C4.5, University of Sydney, Sydney, Australia 2006, quinlan@cs.su.oz.au.

Chakrabarti, Data mining for hypertext: A tutorial survey, SIGKDD Explorations, vol. 1, Issue 2, Jan. 2000, pp. 1-11.

Moody et al., Fast Learning in Networks of Locally-Tuned Processing Units, Neural Computation, 1989, pp. 281-294.

Sarkissian et al., From plastics to customers: inferences based on mixture models, Sep. 2002, pp. 1-12.

Deerwester et al., Indexing by Latent Semantic Analysis, pp. 1-30.

Buntine et al., Is Multinomial PCA Multi-faceted Clustering or Dimesionality Reduction?, Proceedings of the Ninth International Workshop on Artificial Intelligence and Statistics, 2003, pp. 300-307.

Berry, Large Scale Sparse Singular Value Computations, Department of Computer Science, pp. 1-51.

Bottou et al., Local Learning Algorithms, Neural Computation, 1992, pp. 888-900.

McLachlan et al., ML Fitting of Mixture Models, pp. 39-54.

Baeza-Yates et al., Modem Information Retrieval, pp. 123-138.

Bishop, Neural Networks for Pattern Recognition, Department of Computer Science and Applied Mathematics, Oxford University Press, 1995.

Sarle, Prediction with Missing Inputs, SAS Institute Inc., Sep. 7, 1998.

Cadez et al., Predictive Profiles for Transaction Data using Finite Mixture Models, Technical Report No. 01-67.

Savitch, Problem Solving with C++ The Object of Programming, Addison Wesley, 3rd edition, 1999.

Computer Telephony Specialists, Salesforce Automation/Customer Relationship Management, Computer Telephony, May 25, 1999.

Dowla et al., Seismic Discrimination With Artificial Neural Networks: Preliminary Results With Regional Spectral Data, Bulletin of the Seismological Society of America, vol. 80, No. 5, Oct. 1990, pp. 1346-1373.

Duff et al., Sparse matrices storage schemes and simple operations, Direct Methods for Sparse Matrices.

Hofmann et al., Statistical Models for Co-occurrence Data, , Massachusetts Institute of Technology, Artifical Intelligence Laboratory, A. I. Memo No. 1625, C.B.C.L. Memo No. 159, Feb. 1998.

Support Vector Machines, pp. 93-122.

Park et al., Universal Approximation Using Radial-Basis-Function Networks, Neural Computation, 1991, pp. 246-257.

Berry et al., Using Linear Algebra for Intelligent Information Retrieval, Computer Science Department, CS-94-270, Dec. 1994.

Stedman, Utilities, telcos seek marketing edge, Computer World, V32n16., ISSN: 0010-4841, Apr. 20, 1998, p. 20.

* cited by examiner

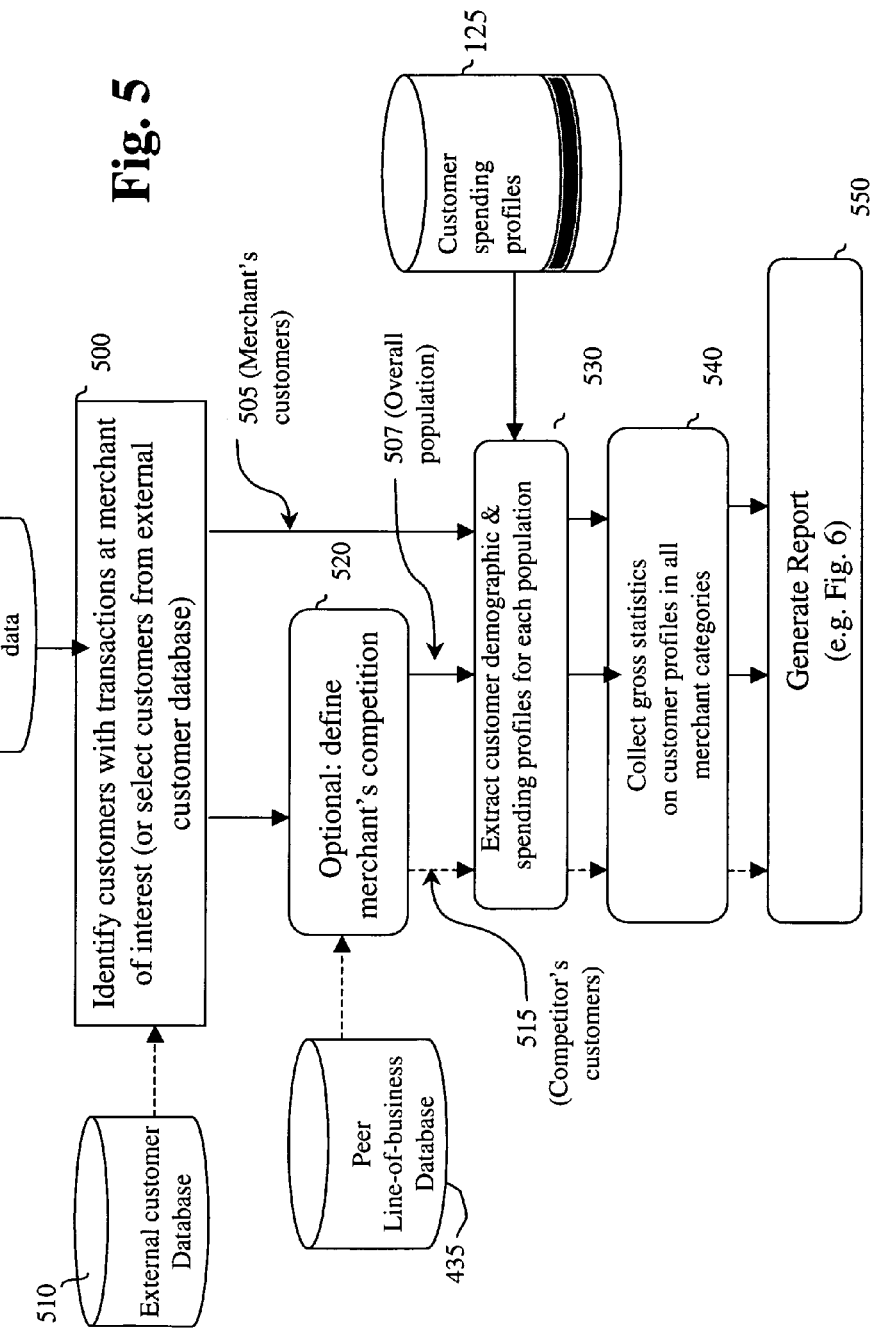

INVENTORY ANALYSIS - CONSUMER DEMOGRAPHIC AND SPENDING PROFILES

Comparison of the spending profiles of people who patronize a major Brand-name mall chain store (catering to families) compared to the overall population. The right-most columns shows the percent of target store patrons and the general population with purchases in each category over the past 2 years, respectively. The index is the relative spending for target store customers, compared to the general population. Directly competing with other toy stores is problematic due to the customer's perception that only Brand-related toys would be available at a Brand-name store. This analysis identifies several opportunities for expansion of store merchandise, most notably: children's clothing and in-store portrait studios. Portrait studio opportunity is especially compelling, since the Brand name contains merchandise that can serve as "props".

| Preferences | Index | Percent BRAND Store Customers | Percent General Population |
|---|---|---|---|
| Mall Stores | | | |
| Children's Clothes | 716 | 29.0 | 4.1 |
| Portraits | 672 | 6.9 | 1.0 |
| Party Stores | 558 | 24.3 | 4.4 |
| Toys - All | 466 | 57.0 | 12.2 |
| High-End | 820 | 11.0 | 1.3 |
| Volume/Discount Toy Stores | 497 | 47.1 | 9.5 |
| Model Trains | 470 | 0.9 | 0.2 |
| Cooking | 416 | 14.4 | 3.5 |
| Arts & Crafts | 366 | 38.0 | 10.4 |
| Video Tapes (Rent & Sales) | 329 | 37.3 | 11.3 |
| Sewing | 357 | 26.2 | 7.3 |
| Hobby Stores | 360 | 11.3 | 3.1 |
| Pet Stores/Animal Clinics | 263 | 41.9 | 15.9 |
| Gift Card Novelty | 256 | 78.1 | 30.5 |
| Furniture/Equipment | 211 | 2.7 | 1.3 |
| Entertainment | | | |
| Amusement Parks | 771 | 34.5 | 4.5 |
| Zoo/Animal Parks | 684 | 8.2 | 1.2 |
| Science and Natural Wonders | 606 | 9.3 | 1.5 |
| Movies | 399 | 21.6 | 5.4 |
| Aquarium | 522 | 6.4 | 1.2 |

| Preferences | Index | BRAND Store | General |
|---|---|---|---|
| Demographic | | | |
| Children PreTeen | 809 | 12.9 | 1.6 |
| Children PreSchool | 806 | 22.6 | 2.8 |
| Expectant Mother Last 3 mos. | 599 | 0.7 | 0.1 |
| New Mother | 522 | 21.3 | 4.1 |
| Children | 365 | 72.4 | 19.9 |
| New Movers | 241 | 9.9 | 4.1 |

Fig. 6

INVENTORY ANALYSIS – PURCHASES MADE ON THE SAME DAY

This example analysis was conducted on a retail store (BRAND NAME store), whose franchises are primarily located in shopping malls. On the same day, a customer is very likely to also visit the mall "anchor" store (typically a major department store) and at least one other store in the mall. The opportunity for inventory expansion can be identified by the dollars spent in different classes of stores on the same day. Adjustments to this opportunity can be made by estimating the relative profit margin, floor space, and inventory requirements or the types of merchandise sold in competing stores.

Top 15 Mall Store Categories

| Category | Volume ($) |
|---|---|
| Department Stores | $2,971,126 |
| Specialty Retail | $1,070,492 |
| Discount Stores | $851,214 |
| Restaurants | $709,875 |
| Hobby, Toy & Game | $563,925 |
| Children/Infant Clothing | $514,985 |
| Women's Ready to Wear Clothing | $459,322 |
| Gifts, Card & Souvenir Shops | $418,429 |
| Jewelry Stores | $388,395 |
| Electronics | $377,903 |
| Shoe Stores | $368,202 |
| Book Stores | $238,850 |
| Men's & Women's Clothing | $217,044 |
| Women's Accessories | $201,611 |
| Furniture & Home Furnishings | $200,477 |
| Sporting Goods | $187,276 |
| Sports Apparel | $141,827 |
| Barber & Beauty Shops | $102,909 |
| Music Stores (CDs, etc.) | $101,455 |
| Computers & Software | $84,115 |
| Portrait Studios | $84,101 |
| Luggage & Leather Goods | $77,658 |
| Stationery & Office Supplies | $65,286 |
| Cosmetic Stores | $46,374 |
| Video Tape Rentals | $46,088 |

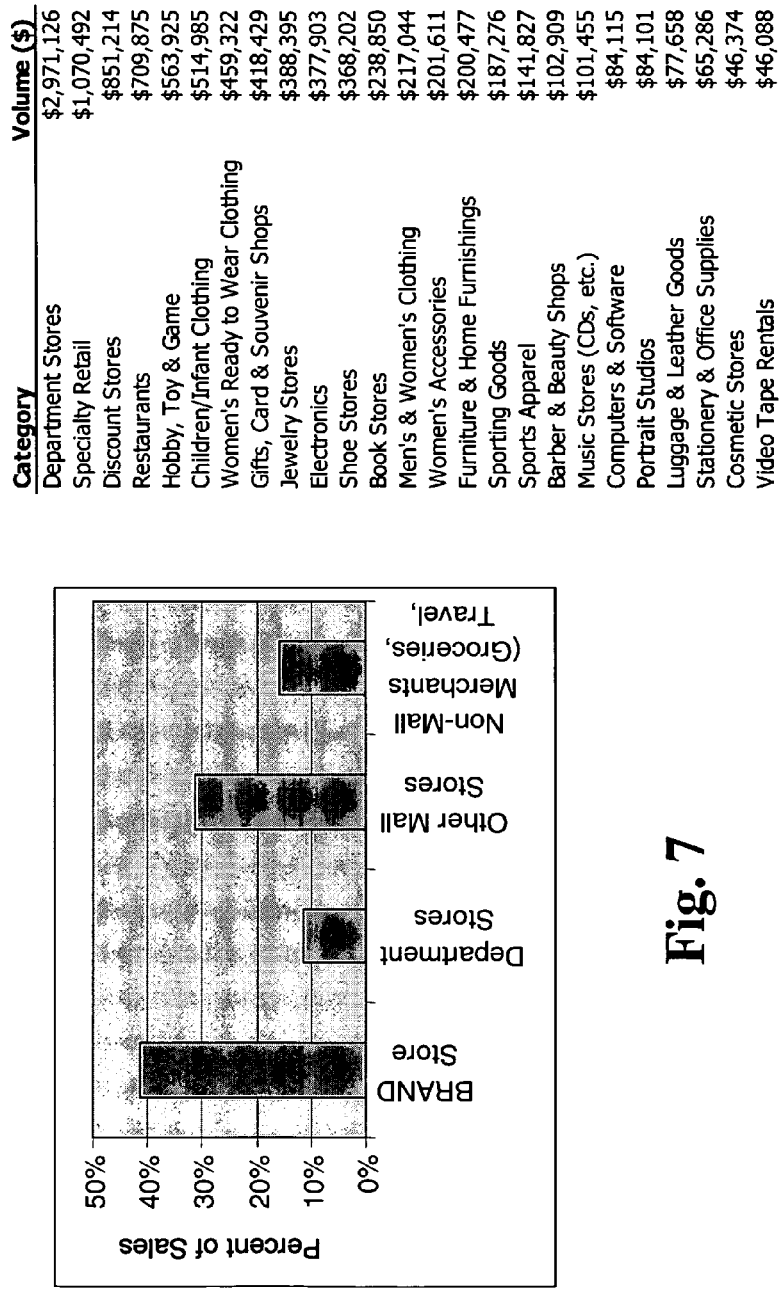

Fig. 7

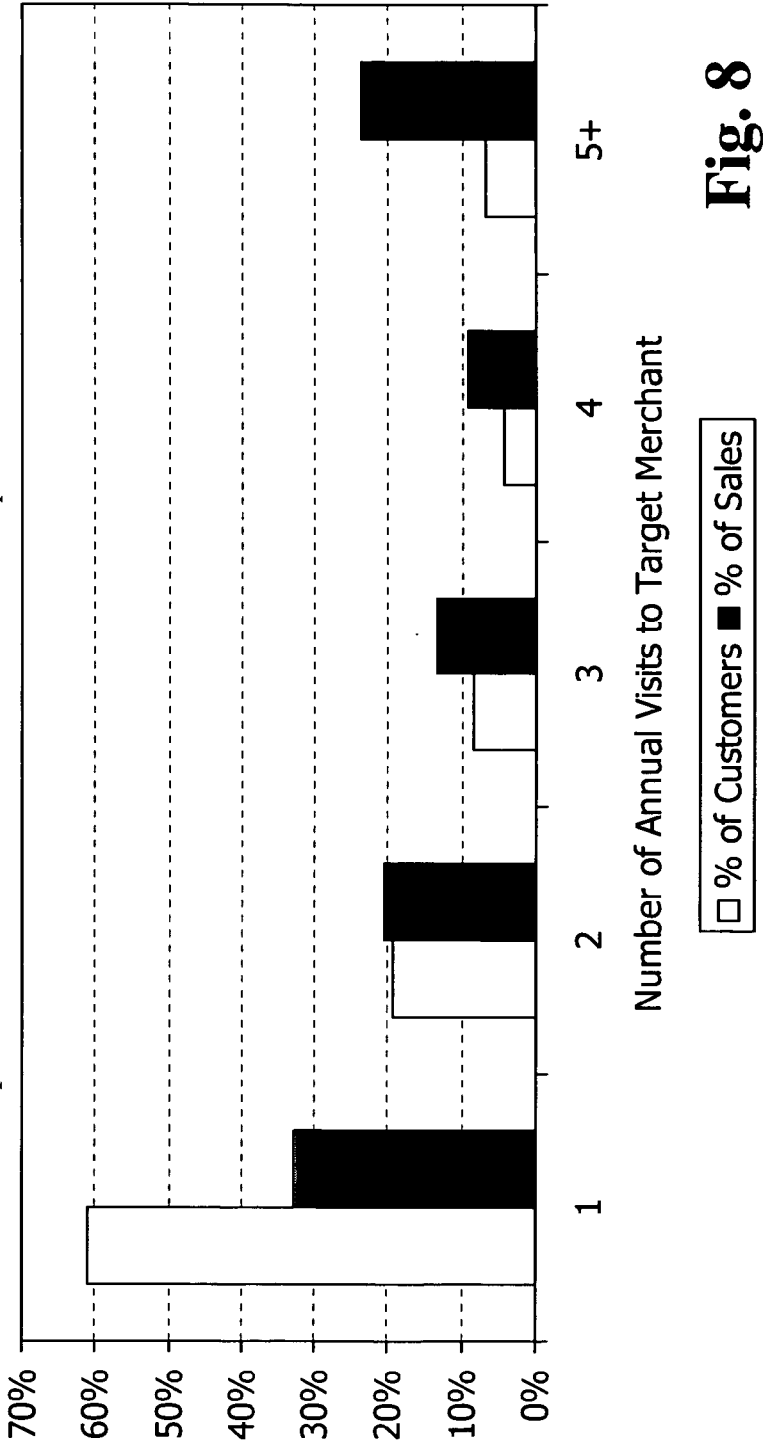

CUSTOMER LOYALTY ANALYSIS - REPEAT CUSTOMERS

The value of customer loyalty can be measured by both frequency and volume. The light bar shows the distribution of repeat customers to a particular merchant in a one year time window. The dark bar shows the corresponding percent of sales attributable to these customers. Once the repeat customer population is identified, a more in-depth analysis can be conducted to find the distinguishing demographics (distance traveled from home, household size, income, home ownership, etc.) and purchase preferences (travel, entertainment, Brand preferences, internet shopping, etc.) of repeat customers, in order to design promotional offers to retain and attract more repeat business.

Fig. 8

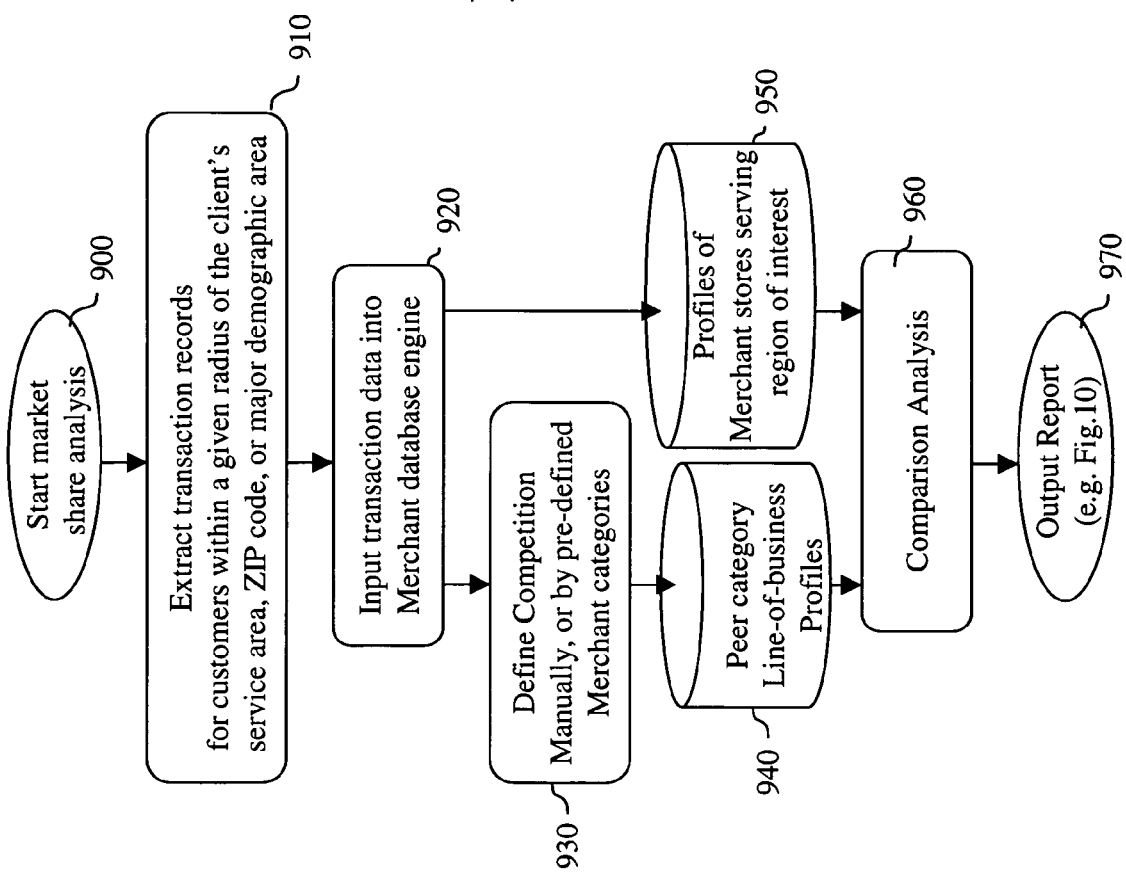

Figure 10

Favorable Share

| 3-Digit Zipcode | City | A Share | B Share |
|---|---|---|---|
| 941 | San Francisco | 93.1% | 6.9% |
| 940 | Suburban San Francisco | 89.8% | 10.2% |
| 802 | Denver | 88.1% | 11.9% |
| 900 | Los Angeles | 81.7% | 18.3% |
| 606 | Chicago | 77.2% | 22.8% |
| 945 | Suburban Oakland | 75.6% | 24.4% |
| 770 | Houston | 71.9% | 28.1% |

Less Favorable Share

| 3-Digit Zipcode | City | A Share | B Share |
|---|---|---|---|
| 852 | Suburban Phoenix | 50.2% | 49.8% |
| 980 | E. Washington State | 48.1% | 51.9% |
| 921 | San Diego | 41.0% | 59.0% |
| 956 | Suburban Sacramento | 29.6% | 70.4% |
| 920 | Suburban San Diego | 28.7% | 71.3% |
| 949 | Suburban San Francisco | 19.9% | 80.1% |

Process Flow: demand and market share –vs- ZIP code:

Merchant analyses/ potential applications:

Customer Profiles:
What are the basic demographics of my customers?
What is the risk/profitability of my customers?
What other goods and services do they regularly buy?
What are the distinguishing characteristics of my repeat customers?
Where do my customers come from (vacation, travel destinations)?

Market Share
What is my market share as a function of ZIP?
Where should I locate my next store (Franchise operators)?

Inventory Analysis:
What other types of products/merchants do my customers patronize?
What other merchants do my customers visit on the same
   day as a purchase from my store?

Predicting/Modeling Consumer Behavior:
The use of merchant profiles to enhance customer-level models
   (delinquency, bankruptcy, fraud, attrition, profitability, life-stage, event
   detection and so on).
Models could use any quantities tracked at the merchant-level. Customer
   variables could be added as needed.

Business Loan Underwriting and Audits
*Publicly traded companies:*
-Can we forecast revenues or profits
-Are their public income statements consistent with historical performance?
*Privately Held Companies:*
-Can merchant-level variables be used to supplement Dunn & Bradstreet reports?
-For small businesses (with no D&B data), can we use merchant-level
   variables in Small business underwriting.
 Historical default, delinquency and/or customer dispute data may be used.
 Such data might be obtained from DUNN & BRADSTREET,
Better Business Bureau, and/or a credit card acquirers, such as PAYMENTECH.

Fig. 15

| Table : Customer Demographic variables | |
|---|---|
| ZIP code | Age |
| IncomeCredit | risk score (e.g FICO score) |
| Wealth | Household size |
| Pet ownership | Homeowner/renter |
| Ages of children | Occupation |
| Recent movers. | |
| Life Events (marriage, graduation, etc.) | |

Fig. 27

Table : Variables Of Interest

A. Gross merchant variables 327
Merchant SIC codes
Number of affiliated stores
Merchant tenure (months in business)

B. Transaction-summary variables 330
Ave & std of transaction amount
Ave & std transaction frequency
Total transaction amount (over a period of time)
Seasonal frequency vs- month
Ave & std distance from customer's home address
% Card not present (CNP)
    recurring payments
    MOTO (mail-order/telephone-order)
    Internet
    e-payment
% approved/declined
% keyed/swiped

D. Customer-level variables 340
Average number of transactions/customer (customer loyalty)
Demographic distributions (age, income, risk, etc.)

E. Outcome-based variables 330, 340, 350
% Chargebacks (requires chargeback transaction file)
*Distinct algorithms may be needed for POC detection*
Customer Default/bankruptcy (requires account-level flags)
Merchant default/bankruptcy/delinquency (requires merchant-level flags)
Merchant profit or revenue or credit rating (requires public records, historical default or delinquency data, or business credit histories)

Fig. 28

SYSTEMS AND METHODS FOR CONSTRUCTING AND UTILIZING A MERCHANT DATABASE DERIVED FROM CUSTOMER PURCHASE TRANSACTIONS DATA

This application claims priority to provisional patent application U.S. Application Ser. No. 60/499,728 filed on Sep. 4, 2003, which is incorporated by reference herein in its entirety.

BACKGROUND OF THE INVENTION

In today's commerce, there is a wide variety of information available from the numerous transactions that people effect each day. As can be appreciated, the nature of transactions vary widely and include debit card transactions, credit card transactions, person-to-merchant transactions, and Internet transactions, for example, only to name a few.

However, known methods and techniques fail to effectively use information relating to the transactions, which are effected by persons, to the benefit of merchants that live and die in the highly competitive arena of today's commerce.

BRIEF SUMMARY OF THE INVENTION

In contrast to known methods and techniques, the invention uses information, which is collected from transactions that people effect in commerce, to the benefit of merchants.

The invention is directed to a method, which may be implemented in a computer system for storing and manipulating transaction data including transaction purchase information, customer demographics information, and merchant information, the computer system comprising a storage device for storing the transaction data and a processor for processing the transaction data. The method may comprise obtaining transaction purchase information generated from a plurality of sources; generating customer profile information based on the transaction purchase information; obtaining merchant information relating to at least one merchant; generating merchant profile information based on the merchant information and purchase transaction information; and processing the customer profile information and the merchant profile information in combination to generate business information. The business information may include merchant profit information, merchant bankruptcy information, merchant revenue, merchant profit projections, and/or merchant market share.

BRIEF DESCRIPTION OF THE DRAWINGS

The present invention can be more fully understood by reading the following detailed description together with the accompanying drawing, in which like reference indicators are used to designate like elements, and in which:

FIG. 5 is a flowchart showing the steps involved in one type of inventory analysis that can be conducted using data generated from a transaction database in accordance with one embodiment of the invention;

FIG. 6 is a flowchart showing a comparison of the spending profiles of people who patronize a particular merchant compared to the overall population in accordance with one embodiment of the invention;

FIG. 7 is a flowchart showing aspects of inventory analysis and purchases made on the same day in accordance with one embodiment of the invention;

FIG. 8 is a flowchart showing aspects of customer loyalty analysis in accordance with one embodiment of the invention;

FIGS. 9 and 10 show aspects of market share by Zip code analysis in accordance with one embodiment of the invention;

FIG. 15 is a table showing potential applications of the systems and methods of the invention;

FIG. 27 is a table showing customer demographic variables in accordance with aspects of the invention; and FIG. 28 is a table showing customer demographic variables in accordance with aspects of the invention.

DETAILED DESCRIPTION OF THE INVENTION

Figure 1:
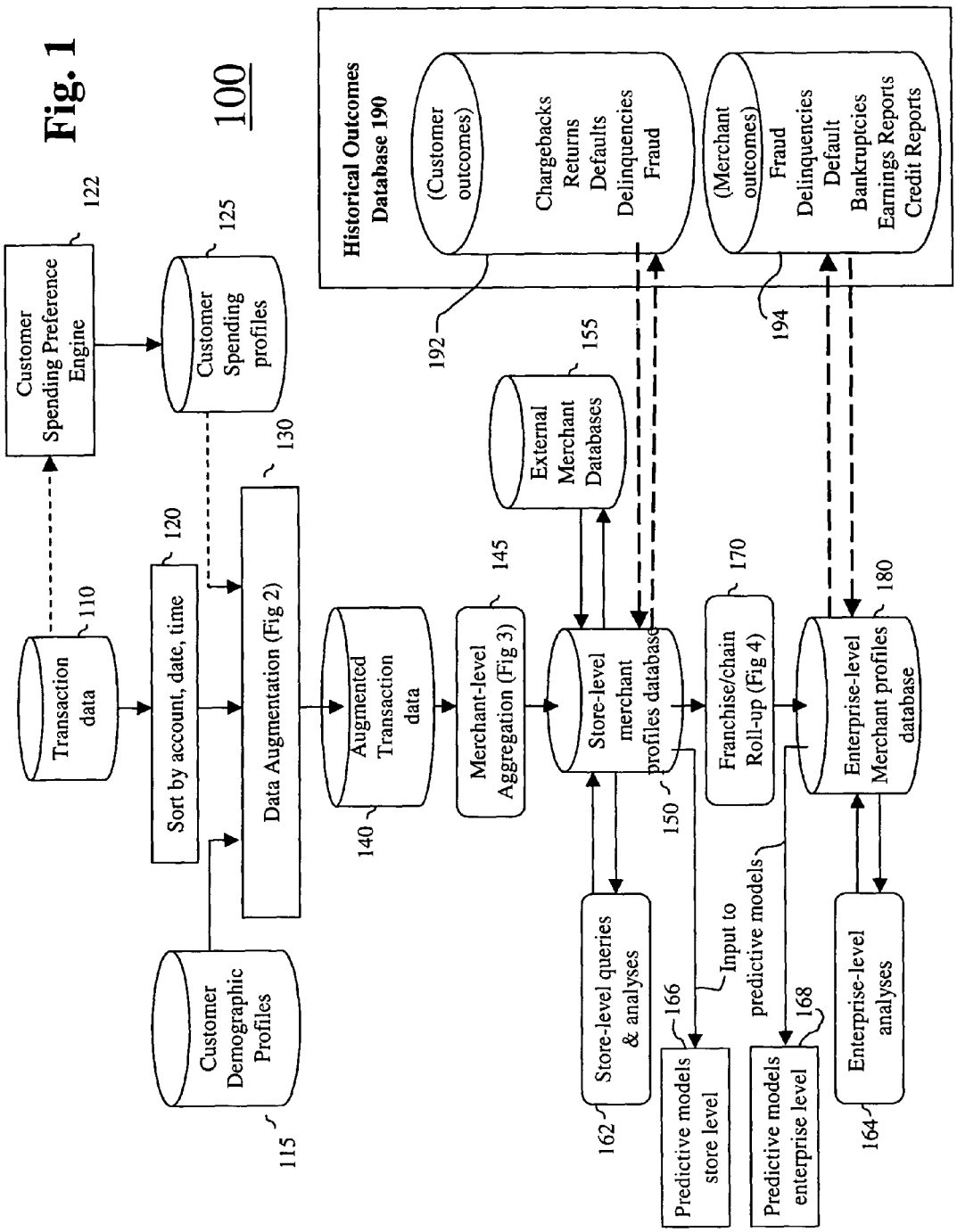
FIG. 1 is a flowchart showing the overall processes involved in constructing a merchant database in accordance with one embodiment of the invention.

Hereinafter, aspects in accordance with various embodiments of the invention will be described. As used herein, any term in the singular may be interpreted to be in the plural, and alternatively, any term in the plural may be interpreted to be in the singular.

In introduction, the invention provides systems and methods to build a merchant-level database, as described below. Various features of the systems and methods of the invention are described below. Further, the invention may include various functionality, such as a web interface for report generation and analysis. As also described below, there are various potential applications of the data provided by the merchant level database in accordance with the various embodiments of the invention.

Merchant profiles (a set of pre-computed quantities aggregated at the merchant level) offer the opportunity to significantly improve performance of a wide variety of account-level models. For example, the invention may be used to calculate risk at the level of an individual merchant. Further, a variety of merchant-level variables can readily be imagined including merchant tenure (how long has the merchant been in business), probability of collusive merchants (fencing operations), and/or chargeback rates, for example. For example, the invention might be used to calculate the bankruptcy risk associated with transactions at particular merchants—even though it is common knowledge that individuals run up charges at particular types of merchants preceding bankruptcy (either behaviorally or intentionally). Although current variables based on Standard Industry Category (SIC) Codes might suffice for this purpose, such variables could undoubtedly be improved due to increasing the precision of poorly structured or overly general SIC Codes, or misclassification errors within SIC codes.

Further, the systems and methods of the invention provide opportunity for a merchant database of a company to be used in a partnership between the company, for example, and some other business entity. Besides allowing for rapid sizing and targeting analyses for cross-sell opportunities, a merchant database of the invention would facilitate detailed analysis about various information of a business partner of a bank, or other institution for example. Information might be obtained about a business partner's customers and competition, for example.

Further, the merchant database of the invention could be utilized to provide information to competitors if desired. It is of course appreciated that a bank, for example, would not be able to share specific information about its customers or particular competitors, but it should be possible to provide information in aggregate, such as customer profiles, revenue projections, or market share. Such analyses would be valuable marketing intelligence, which a bank could use as bargaining chips in contract negotiations or to deepen existing relationships. Examples of analyses are listed below. In many cases, the merchants will already have much of this information. However, it was observed in development of the invention that some business entities do indeed have gaps in their customer information database (e.g. a foreign airline could not tell us where their U.S. passengers live).

In accordance with one aspect of the invention, a bank utilizing the systems and methods of the invention might tell a merchant about their credit card customers':

1. Spending Behavior including average purchase amount/visit, average annual amount spent, frequency of visits and/or revenue by ZIP code;
2. Customer Loyalty including what fraction are repeat customers and/or what are the spending characteristics of repeat customers;
3. Customer Demographics compared to overall population including age, income, home ownership, profession, and so on; and
4. Revenue Forecasting.

Further, a bank utilizing the systems and methods of the invention might tell a merchant about its competition's:

1. Market Share including geographical distribution of market share and market share for various product lines such as appliances, furnishings, hardware, for example;
2. Inventory/product expansion information and information regarding what other types of purchases/merchants are characteristic of existing customers; and
3. New Store locations including information relating to what regional markets are under-served.

Various aspects of the systems and methods of the embodiments of the invention are described below. In the invention and the utilization of a merchant database, various quantities may be of potential interest. Quantities of potential interest that relate to a merchant business may include SIC code, type of business (service, retail, government, etc.), primary or secondary line of business, franchise/chain data, average transaction amount; standard deviation of transaction amount; sales projections; average distance from customer's residence, average and standard deviation distance from customer's residence; and customer loyalty/repeat business (total number of transactions/total number of accounts), for example.

Quantities of potential interest that relate to Customer fraud/risk might include "Point-of-Compromise" (POC) risk (for detecting counterfeit operations); fraud risk (fence operations, luxury goods, etc.); default risk of customers (average customer. chargeoff/bankruptcy rate); Durable goods/auto repairs; percentage of Mail-order/Telephone-Order (MOTO); percentage of "Card Not Present" (CNP) transactions and other automated drafts; percentage of transactions read with magnetic stripe versus keyed; percent of transactions returned or charged back to the merchant ("chargebacks"); average and standard deviation of distance from customer's residence; and average and standard deviation of the transaction amount, for example.

Quantities of potential interest that relate to merchant fraud/risk might include chargeback/dispute rates (which would typically require chargeback records), merchant tenure (months in business), fraud rate which (might require historically-validated fraud transaction data), and POC risk (which might require date of first fraud at the account level), for example.

Quantities of potential interest that relate to Sales Channel might include percentage MOTO transactions; percentage of CNP transactions or automated drafts; percentage internet purchases; percent Television or Infomercial generated transactions; percent keyed transactions or recurring payments, for example.

Quantities of potential interest that relate to Customer Demographics might include average and standard deviation of customer age; gender; average number of children;

household income; homeowner v. renter; credit risk of customers (average FICO score of customers for example) and/or information about demographic clusters, for example.

In accordance with embodiments of the invention data processing is performed at the merchant-level. A transaction record between a merchant and a customer typically contains a data field to identify both the customer and the merchant (usually an account number or customer's name and address), the transaction amount, and the date and time of the transaction. In addition, credit card transactions also include store location (country, city, state and ZIP code), a text description of the merchant, the "Standard Industry Classification" (SIC) code of the merchant, and various transaction details (such as point-of-sale device characteristics) and sometimes even item-level information, i.e., such as travel reservation confirmation codes, etc.

Hereinafter, further aspects of the systems and methods of the invention will be described with reference to the drawings.

Figure 2:
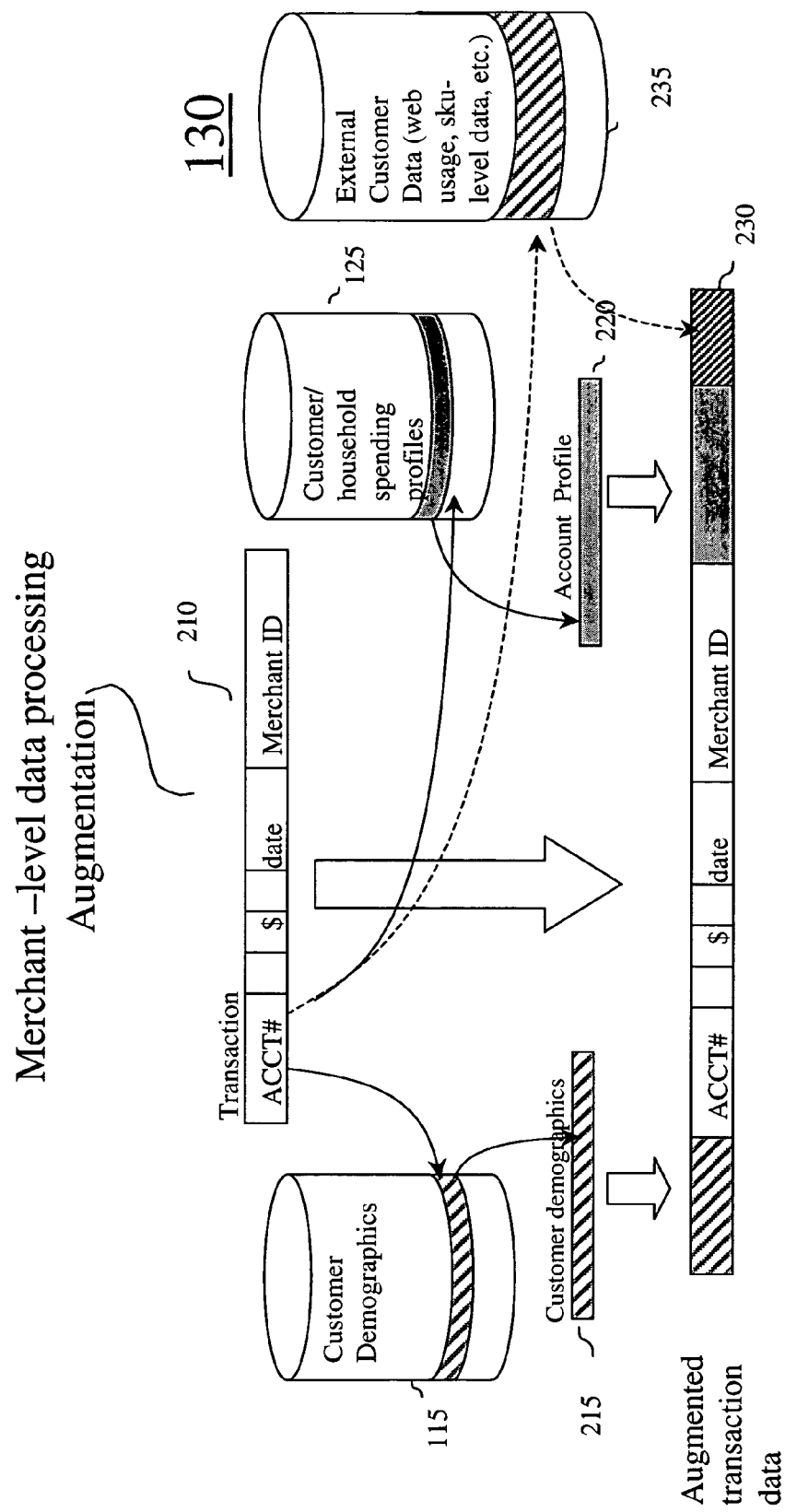
FIG. 2 is a flowchart showing an augmentation process in accordance with one embodiment of the invention.

FIG. 1 illustrates an overall processes 100 involved in constructing a merchant database in accordance with one embodiment of the invention. The process starts with transaction data 110. The transaction data 110, indexed by an individual customer identifier, such as an account number, social security number, or name and address is sorted in step 120. This sorting may be performed first by customer ID (e.g. account number), then by date and time of transaction, to simplify downstream processing, in accordance with one embodiment of the invention. The data may be augmented in step 130 by additional data sources, such as customer demographic profile information 115 or customer spending profiles 125. FIG. 2 gives further detail on the augmentation process.

The augmented transaction data 140 is then sorted and aggregated in step 145 by a unique merchant/store identifier, i.e., unique to that particular merchant/store. At this point in the processing, detailed further in FIG. 3, several quantities of interest can be calculated from transactions at a particular store. Store-level merchant profiles 150 (variables aggregated at the store-level) can be further augmented with external merchant data 155 (such as credit bureau reports). These merchant profiles can be used to conduct a wide assortment of analyses of merchants as shown in step 162, and which are illustrated by various examples given below. The store level merchant profiles may also be used as inputs to statistical or predictive models to predict customer or merchant events, such as chargebacks (purchase transaction disputes), defaults, delinquencies, fraud, and so forth, for example. For example, the store level merchant profiles may be input into store level predictive models 168.

Predictive models typically require training using historical outcomes (192, 194) under the assumption that patterns of behavior that lead to these events are stable over time. To explain, FIG. 1 shows an historical outcome database 190. The historical outcome database 190 contains customer outcomes 192, i.e., outcomes related to customers, as well as merchant outcomes 194. More specifically, the customer outcomes 192 contain parameters of customers that are associated with a particular activity. In a similar manner, the merchant outcomes 194 contains parameters of merchants that are associated with a particular activity. The customer outcomes 192 may include chargebacks, returns, defaults, delinquencies, and/or fraud, for example. The merchant outcomes 194 may include fraud, delinquencies, default, bankruptcies, earnings reports and/or credit reports, for example. The customer outcome database 192 and the merchant outcome database 194 in the historical outcome database 101 may use data from the store-level merchant profiles 150 and the enterprise level merchant database. Further, the customer outcome database 192 and the merchant outcome database 194 (and the information stored therein) may be used to generate the store level merchant profiles 150 and the enterprise level merchant profiles 180 and may of course be used in the predictive models. The use of merchant profiles in the development of predictive models is further described below with reference to FIGS. 15-26.

In particular for large businesses, such as franchise operations with multiple store locations and large enterprises with multiple lines of business, the store level profiles 150 are aggregated, i.e., "rolled-up", as shown in step 170 and output to an "enterprise-level" database 180. Enterprise-level profiles can also be used for enterprise-wide analyses 164 as well as used in enterprise level predictive models 168. That is, predictive models can also be built to predict a wide variety of events at the enterprise-level, such as profit and loss, merchant defaults and bankruptcy, for example, as well as at the store level.

FIG. 2 shows further aspects of transaction data processing and augmentation. A transaction record 210 generated as a result of a transaction between a merchant and a customer typically contains a variety of information. For example, the transaction record 210 may contain a data field to identify both the customer and the merchant (usually an account number or customer's name and address), the transaction amount, and the date and time of the transaction. In addition, the transaction record may also include store location (country, city, state and ZIP code), a text description of the merchant, the "Standard Industry Classification" (SIC) code of the merchant, and various transaction details (such as point-of-sale device characteristics) and sometimes even item-level information (travel reservation confirmation codes, etc.). Ultimately, these transaction data will be aggregated for each merchant, as described in detail in FIGS. 3 and 4 below. However, at this stage in the processing, the value of transaction data can be greatly enhanced (or augmented) by merging these data with additional data sources, such as customer demographic and credit profiles 115, customer spending profiles 125, and other external databases 235, i.e., such as web usage data, and SKU level data, for example.

It is appreciated that the transaction purchase information, such as the information 210, may be generated based on one or more of credit card activity, debit card activity, checking activity, and ACH transaction activity of consumers, for example, as well as stored value card activity, interne payment activity, and wireless payment activity, for example. Further, the transaction purchase information may be generated based on activity associated with a private label card. Transaction purchase information associated with a private label card typically includes additional information, as compared to a standard credit card, e.g., VISA. For example, transaction purchase information associated with a private label card typically includes identification of a particular item that has been purchased, i.e., including stock keeping unit (SKU) information.

Customer profiles can be obtained from a plurality of sources. One common source is demographic databases and the census bureau, which typically contain basic demographic information, such as age, income, zip code, home ownership, market value of home, gender, marital status, and so on. Many merchants maintain databases on their own customers, but the data is limited to that gathered by the merchant at time of sale or through questionnaires in warranty registrations. Types of information collected depend on the type of business. For example, some retailers (such as mail-order catalog and book-of-the-month clubs) maintain detailed SKU-level data (Stock Keeping Unit-level data) on all items purchased over a year. Grocery stores collect these data through coupon-rewards programs. Airlines collect flight itineraries. Internet service providers and merchants might maintain databases containing self-reported profile information, websites visited, as well as internet purchases.

The augmentation processing of FIG. 2 uses customer demographic information or profiles 215 stored in a customer demographics database 115, as shown in FIG. 2. Since transaction data is linked to individual account numbers, key demographics (home ZIP, age, income, credit score, and home ownership information, for example), such information corresponding to a customer ID or account number can be appended to transaction data 210. Gross statistics on customer demographics (e.g. average and standard deviation of customer age) could then be computed in the same way as gross statistics on transaction amounts. Collectively, these statistics would then constitute a demographic "profile" of the merchant's customer base. This profile could then be used to define target populations for marketing campaigns. A list of potential customer demographics is given in the table of FIG. 27.

A simple merchant profile might contain the population average of customers patronizing the merchant. However, the fact that the average customer age is higher for one merchant compared to another might not, by itself, be very significant. In general, it is more useful to calculate both the average and variance of a population. For some applications, even higher-order moments of the population distribution, or even a population distribution might be stored. As noted above, examples of potential customer demographic variables are given in the table of FIG. 27.

As described herein, customer spending profiles 125 and/or account profile information 220 may be used in various embodiments of the systems and methods of the invention. Customer spending profiles 125 can be generated by various techniques from a plurality of data sources. Simple profiles might include customer spending in discrete categories (e.g. groceries, gasoline, auto-related, travel, and so forth). Profiles could be generated from transactions data in the separate processing system 122 of FIG. 1 (as described in U.S. Pat. No. 6,505,168 to Rothman et al., issued Jan. 7, 2003, which is incorporated herein by reference in its entirety). Other sources of spending profiles could be generated from SKU-level purchase data. More analytic profiling methods, based on cluster analysis, dimension reduction techniques, hidden Markov models, or mixture models could also be derived from transaction data (several embodiments of transaction-based spending profiles are described in U.S. patent application Ser. No. 10/638,643, filed Aug. 12, 2003, which is incorporated herein by reference in its entirety).

With further reference to FIG. 2 and the data augmentation processing, the transaction information 210, customer demographic information (e.g., profiles) 215, account profiles 220, and other customer databases 235 can be merged using a customer identifier, such as name and address, ZIP code, or account number, for example. The resulting augmented transaction record 230 is then used to construct merchant profiles, as shown in FIG. 3.

Figure 3:
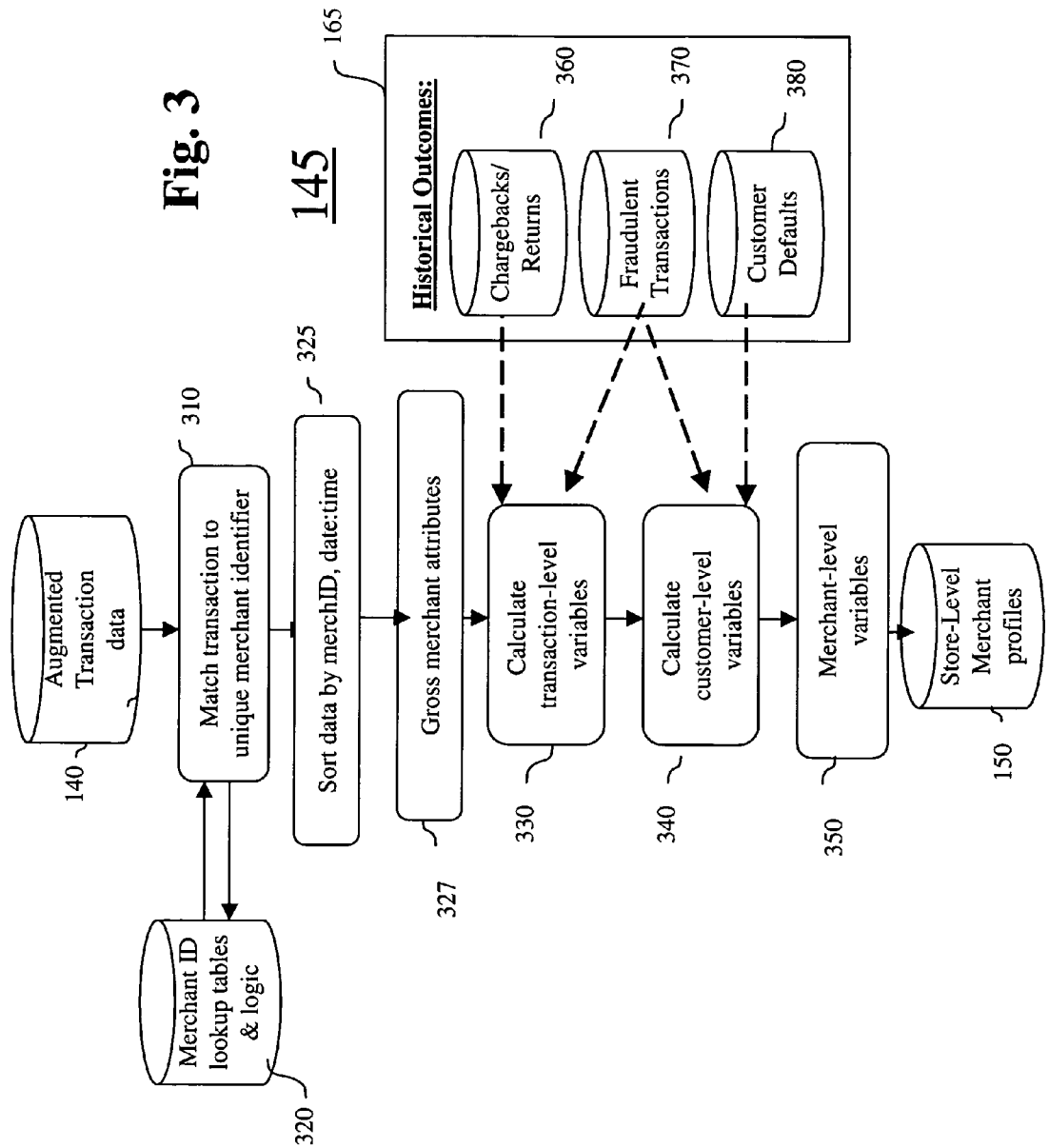
FIG. 3 is a flowchart showing aspects of construction of store-level merchant profiles in accordance with one embodiment of the invention.

FIG. 3 shows construction of store-level merchant profiles. The process of FIG. 3 starts with the augmented transaction data 140 and passes to step 310. In step 310, the transaction information is matched to a unique merchant identifier. Due to the wide variety of transaction data available (e.g. credit card, internet, and check data), data formats, and variability of ways merchants are identified in transaction records, a database 320, or lookup table will usually be required to link transactions to a unique merchant identifier 310. One potential key that could be used as a merchant identifier would be a concatenation of the merchant's acquirer ID (identifier of the merchant's transaction processor) and the merchant's account number with that processor. Alternative identifiers include a combination of the merchant's 9-digit ZIP code and SIC code or a concatenation of ZIP and the first 6-10 characters in the merchant's transaction description.

Once data is linked to a unique merchant identifier, it is sorted in step 325 by that identifier, then by date and time of transaction, to simplify processing. At this point, several merchant-level variables, or quantities of interest, can be calculated or extracted. The computational requirements for calculating these quantities can vary by application. Some variables of interest are quite simple, such as the merchant's line of business, industry classification, number of retail stores, or number of years in business. The latter can be obtained from external databases, such as business listings or extracted from the oldest transaction in the database (assuming a sufficiently long transaction history resides in the transaction database). We refer to these variables as "gross merchant variables" or attributes 327. At the next level of complexity are Transaction-level variables 330, i.e., quantities calculated over all transactions at a merchant, without regard to who the customer is. Examples include the average (and standard deviation) transaction amount at a merchant. Several more examples of such transaction-level variables are given in the table of FIG. 28.

Further, customer-level variables 340 may be calculated in the processing of FIG. 3, i.e., transactions at a given merchant can also be aggregated at the customer-level 340. FIG. 28 also illustrates such customer level variables 340. After the calculation of customer-level variables, the processing of FIG. 3 passes to step 350 in which merchant level variables are calculated. A simple variable that can be calculated at the merchant-level is the average number of transactions/customer at each store. This could be calculated directly for each account in the transaction database, or as the ratio of number of transactions/time and number of unique account numbers/time.

More generally, a merchant may be interested in the distribution of their repeat customers (a histogram of the number of transactions per customer at each store). Collecting these data for all merchants in the database might be computationally expensive. However, a secondary engine can be developed to "drill down" to analyze transactions only on accounts that had at least one transaction at the merchant of interest. A second round of processing could then be conducted at the account-level. More examples are given in FIG. 28.

Various additional variables can be calculated, assuming one has access to historical outcome data 165. Examples of merchant variables of interest include the fraud rate at a merchant, the chargeback (or returned merchandise) rate, and even the rate of customer payment defaults at a merchant. Depending on application, these data may be accessed at the transaction or customer level. Chargeback data 360 for example, is typically collected at the transaction level. Fraud data 370 can be at the account-level or transaction-level. Customer defaults 380 are collected at the customer-level (which may link to more than one account). Finally, some outcome-based variables (such as merchant revenues or default information) are calculated at the merchant-level 350 or enterprise-level. The resulting variables are then stored in a store-level merchant profile 150.

Figure 4:
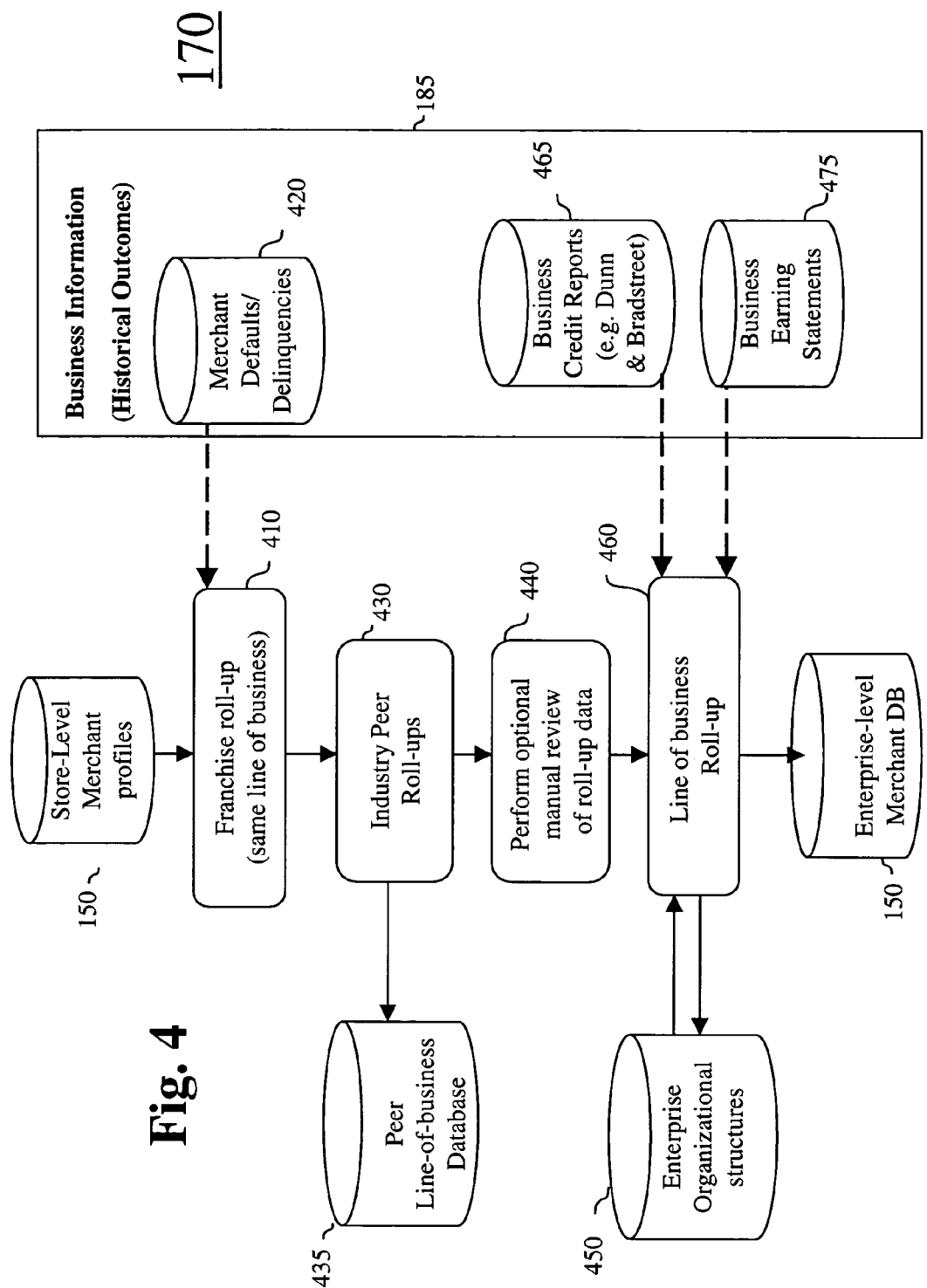
FIG. 4 is a flowchart showing a process of aggregating information accumulated from individual stores to business or enterprise-level in accordance with one embodiment of the invention.

FIG. 4 illustrates the process of aggregating information accumulated from individual stores to the business or enterprise-level. Again, quantities of interest will vary with the type of business, and may be handled by separate processing steps. For example, with a simple franchise operation 410, many enterprise-level variables may simply be calculated as the sum of any quantities calculated at the store-level. Exceptions to this rule include the fact that many franchises may wish to know the distribution of revenues over all of its stores.

Depending on the structure of a franchise, individual stores may default without affecting the enterprise. In such cases, merchant default or delinquency variables 420 would be calculated at the store-level.

In order to compare businesses competing in the same line-of-business, it is necessary to define the industry peers. As a first approximation, many businesses are conveniently classified by their Standard Industry Category (SIC) code or Merchant Category Code (MCC). These codes are quite effective for certain industries. However, they are notoriously inaccurate in identifying industry peers and competitors in many modern industries, i.e., such as telecommunications, interne, or mail-order businesses, to name a few. Hence, in addition to developing a database for unique merchant identifiers 320, a "line of business" database 435 would greatly improve competitive and market share analyses. For some industries, the elements of this database might include lists of specific merchants in competition, developed from an expert in the industry of interest. Once established, store and franchise-level data can readily be aggregated (as shown in step 430 of FIG. 4) into a peer line-of-business database 435.

Further, FIG. 4 shows that a line of business roll-up 460 may be performed. Enterprise organizational information 450, such as franchise operations (multiple locations, linked to a parent company) may well need to be taken into account in profiling large organizations, especially those with several lines of business. For example, SEARS not only has multiple department stores, but mail-order and internet business, portrait studios, driving schools, and automotive business units. Separate business units compete in entirely different industries. The complex nature of such organizations dictate that such relationships would need to be explicitly coded into the database by a subject matter expert. The number of large enterprises, however, is small (in the hundreds), compared to the number of merchants in the United States (on the order of 4-6 million).

At this level of aggregation of step 460 of FIG. 4, enterprise-level data can be compared to public earnings reports 475 and business credit reports 465, for use in validation or audits of company statements, underwriting risk, and forecasting of future earnings. After the line of business roll-up 460, the generated information is output to an enterprise level merchant database 150, in accordance with one embodiment of the invention.

As reflected in FIG. 4, an optional manual review of roll-up data may be performed at 440. That is, it may be desired or necessary to manually review the data so as to clean up the data. This step might be performed at 440 or at some other desired point in the process.

Hereinafter, examples of merchant and enterprise-level analyses are described in accordance with some embodiments of the invention.

FIG. 5 details the steps involved in one type of inventory analysis that can be conducted using augmented transaction data 140 generated from a transaction database, in accordance with one embodiment of the invention. In this example, a particular merchant's customers are identified in step 500, using either a customer database 510 or data extracted directly from the augmented transaction database 140. The population defined as the merchant's customers 505 is then compared to the remaining population or the population "at large" 507. An optional process at this point 520 would be to identify a sub-population of the merchant's competitor's customers 515, defined by a peer line-of-business database 435. Profiles of the customers 125 for each of these populations is then extracted in step 530, and various statistics are calculated to compare the spending and demographic characteristics of these populations in step 540. In step 550 of FIG. 5, a report may be generated. FIG. 6 shows an example of such a report.

That is, FIG. 6 shows a comparison of the spending profiles of people who patronize a particular merchant (catering to families), compared to the overall population. Not surprisingly, major demographic characteristics of customers include households with children or expectant mothers. These demographics also correlate with spending at amusement parks, video rental stores, and so on. The value of these profile comparisons is two-fold: (1) They measure the relative magnitude of these differences, and (2) they discover less obvious correlations and opportunities. For example, these customers are nearly seven times more likely to visit a portrait studio in the same year than the overall population. This represents a unique opportunity to establish in-store portrait studios, to exploit this intrinsic demand.

Further analysis can be conducted on transaction data to answer specific questions, relevant to the business. For example, a major mall retailer is commonly interested in knowing what other stores in the same mall are visited by their customers. Transaction data offers the opportunity to obtain accurate and precise answers to this particular question. For example, FIG. 7 shows the distribution of spending of customers on the same day as a purchase at a major mall chain store.

This type of analysis might be too specific to incorporate directly into a pre-computed merchant database; however, the analysis is greatly simplified by access to the merchant database. For example, in order to conduct a "same day purchase" analysis, one could pre-select accounts with purchases at the client store, retaining only transactions on these accounts occurring on the same day. One could then feed the selected transactions into the merchant database engine to build a same-day purchase database.

To explain further, the FIG. 7. Inventory analysis relates to purchases made on the same day. The example analysis of FIG. 7 was conducted on a retail store, whose franchises are primarily located in shopping malls. On the same day, a customer is very likely to also visit the mall "anchor" store (typically a major department store) and at least one other store in the mall. The opportunity for inventory expansion can be identified by the dollars spent in different classes of stores on the same day. Adjustments to this opportunity can be made by estimating the relative profit margin, floor space, and inventory requirements for the types of merchandise sold in competing stores, for example.

In further illustration of analysis that may be performed, FIG. 8 relates to a customer loyalty analysis and repeat customers. The value of customer loyalty can be measured by both frequency and volume. The light bar of FIG. 8 shows the distribution of repeat customers to a chain store, in a one year time window. The dark bar of FIG. 8 shows the corresponding percent of sales attributable to these customers. Once the repeat customer population is identified, a more in-depth analysis can be conducted to find the distinguishing demographics (such as distance traveled from home, household size, income, and home ownership, etc.) and purchase preferences (travel, entertainment, Brand preferences, and interne shopping, etc.) of repeat customers, in order to design promotional offers to retain and attract more repeat business.

In accordance with one embodiment of the invention, FIGS. 9 and 10 show market share analysis by Zip-Code. Market share can be defined as the percent of sales within a given category of merchants or particular competitor. In this example, market share for a large retail chain, A, is given in direct comparison to its most obvious competitor, B. Overall, A has 65% share of this two-chain market, but this varies by region. FIG. 9 shows the steps that might be used to determine market share by Zip code in accordance with one embodiment of the invention.

As shown, the process of FIG. 9 starts in step 900 and passes to step 910. In step 910, the process extracts transaction records for customers within a given radius of the client's service area, ZIP code, or major demographic area. Then in step 920, the process inputs transaction data into the merchant database engine. Thereafter, in step 930, the process defines the competition manually, or by pre-defined merchant categories. Then, in step 940, the process develops peer category line-of-business profiles. In parallel with steps 930 and 940, the process generates profiles of merchant stores serving the particular region of interest.

Thereafter, in step 960, a comparison analysis is performed. Then, in step 970, a suitable report is output. FIG. 10 shows such a report.

As shown in FIG. 10, relating to market Share by Zip-Code, market share can be defined as the percent of sales within a given category of merchants or a particular competitor. In this example, market share for a large retail chain, A, is given in direct comparison to its most obvious competitor, B. Overall, merchant A has 65% share of this two-chain market, but this varies by region.

Figure 11:
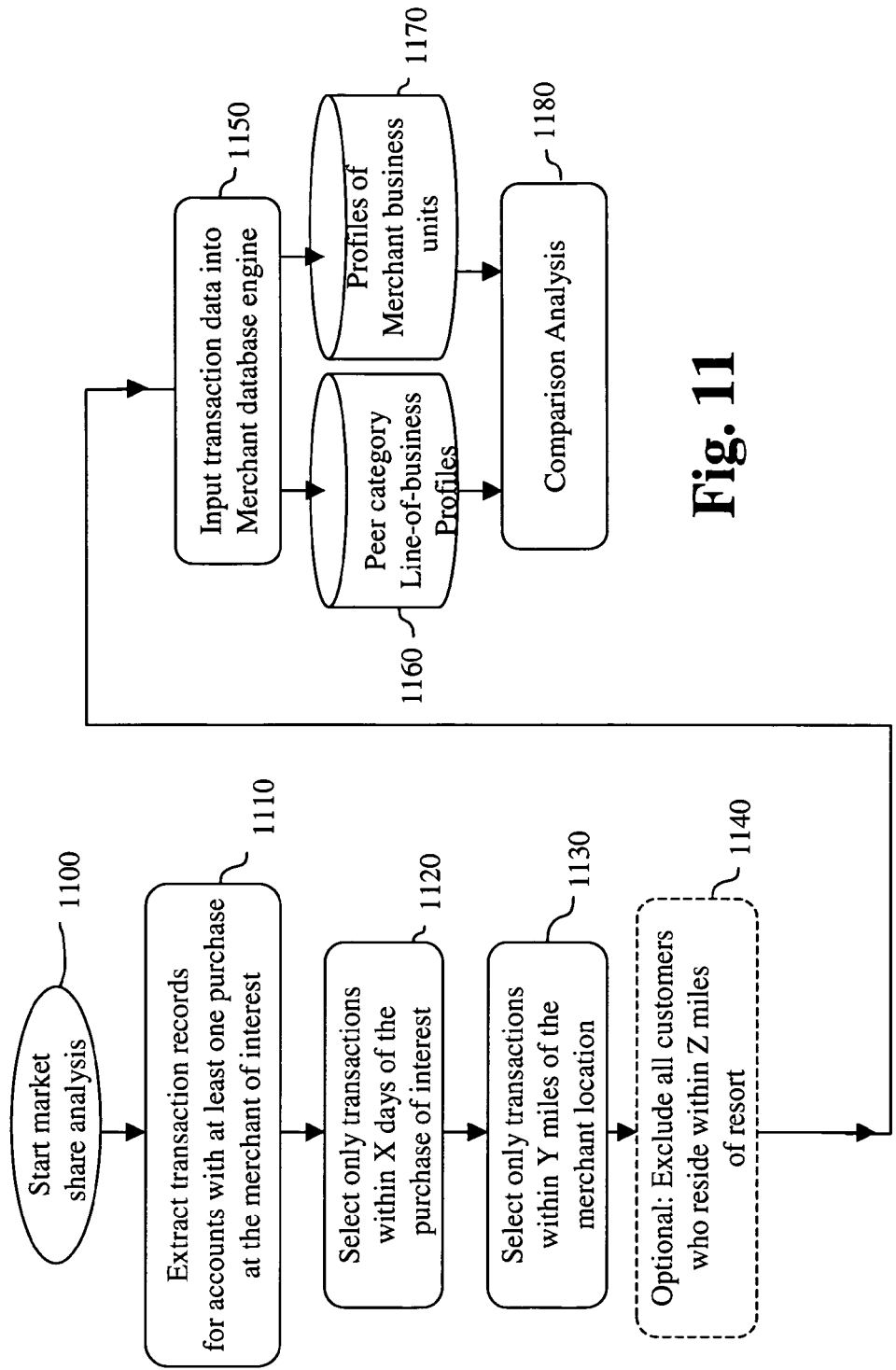
FIGS. 11 and 12 show aspects of wallet share analyses in accordance with one embodiment of the invention.
Figure 12:
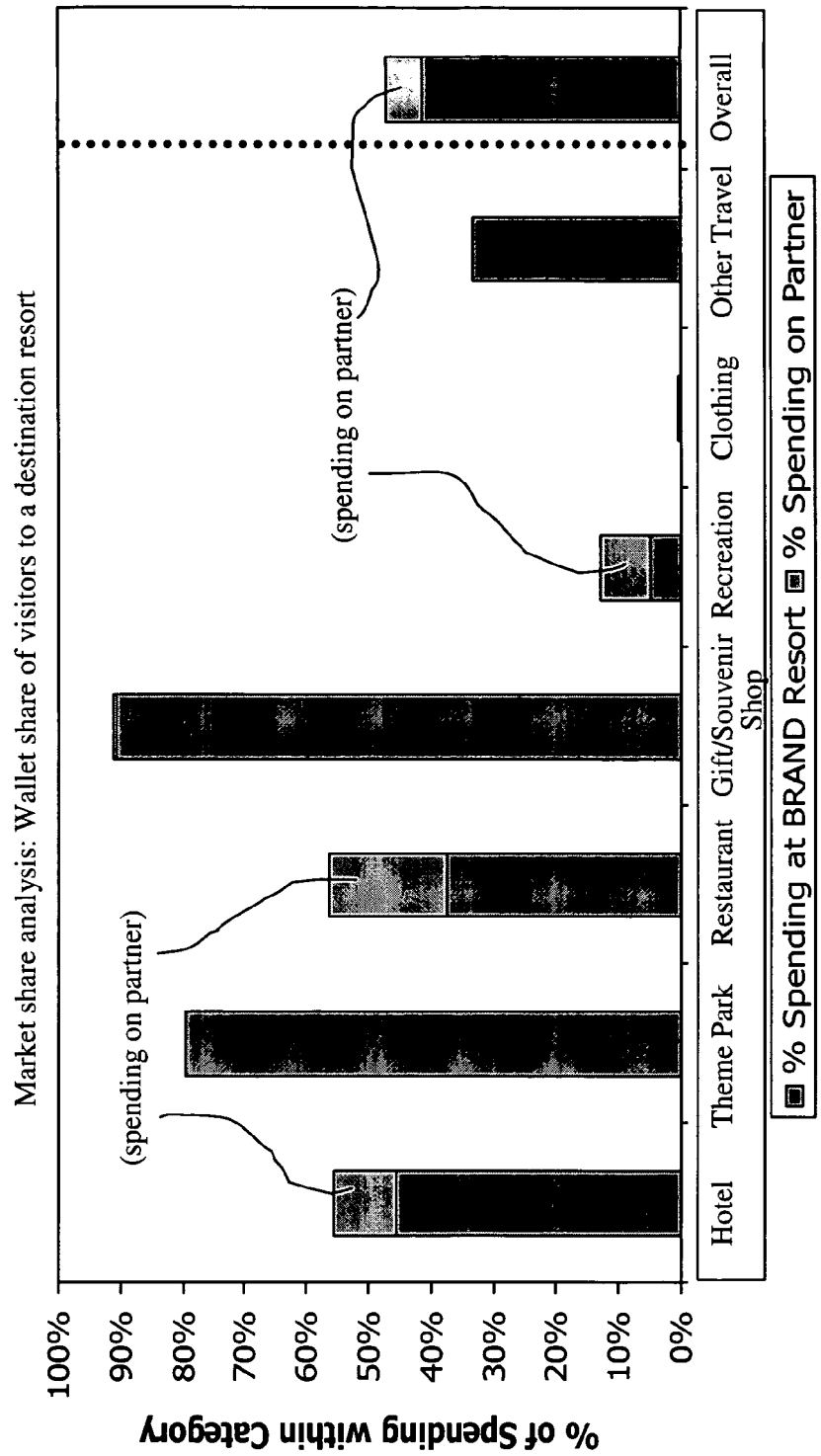

FIG. 11 shows a process in accordance with one embodiment of the invention that may be used to perform a wallet share analysis. Further, FIG. 12 shows illustrative results of the process of FIG. 11. The process results in information regarding the spending at a particular resort versus spending on another entity, i.e., for example a partner as reflected in FIG. 12. In particular, the process compares peer category line-of-business profiles with profiles of particular merchant business units in step 1180 of FIG. 11.

In accordance with one embodiment of the invention, the process of FIG. 11 starts in step 1100, and then passes to step 1110. In step 1110, the process extracts transaction records for accounts with at least one purchase at a particular merchant of interest. Then, in step 1120, the process selects only transactions within X days of the purchase of interest. As can be appreciated, X may be varied as desired. Then, in step 1130, the process selects only transactions within Y miles of the merchant location. Y may also be varied depending on the particular interest of the user. Then, the process passes to step 1140.

Step 1140 represents an optional step that may be implemented, i.e., depending on the interest of the user. Specifically, in step 1140, the process excludes all customers who reside within Z miles of the particular resort.

After the optional step 1140, the process passes to step 1150. In step 1150, the transaction data is input into the merchant database engine. Thereafter, two profile analyses may be performed in parallel. That is, peer category line-of-business profiles may be generated. Further, profiles of particular merchant business units may be generated. Thereafter, further comparison analyses may be performed, as is desired. Accordingly, the subprocess of FIG. 11 ends in step 1180.

Figure 13:
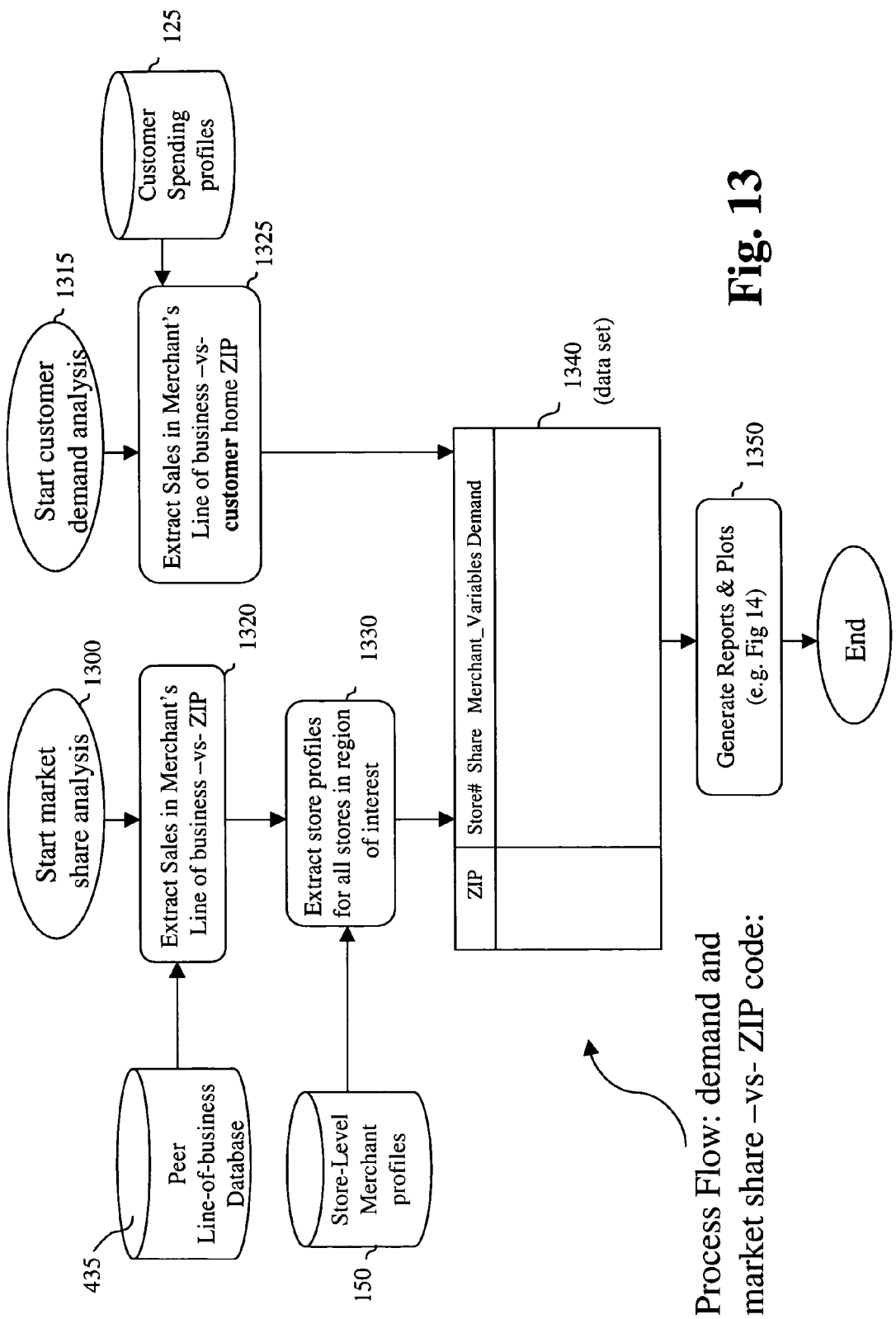
FIGS. 13 and 14 show aspects of market share analysis in accordance with one embodiment of the invention.
Figure 14:
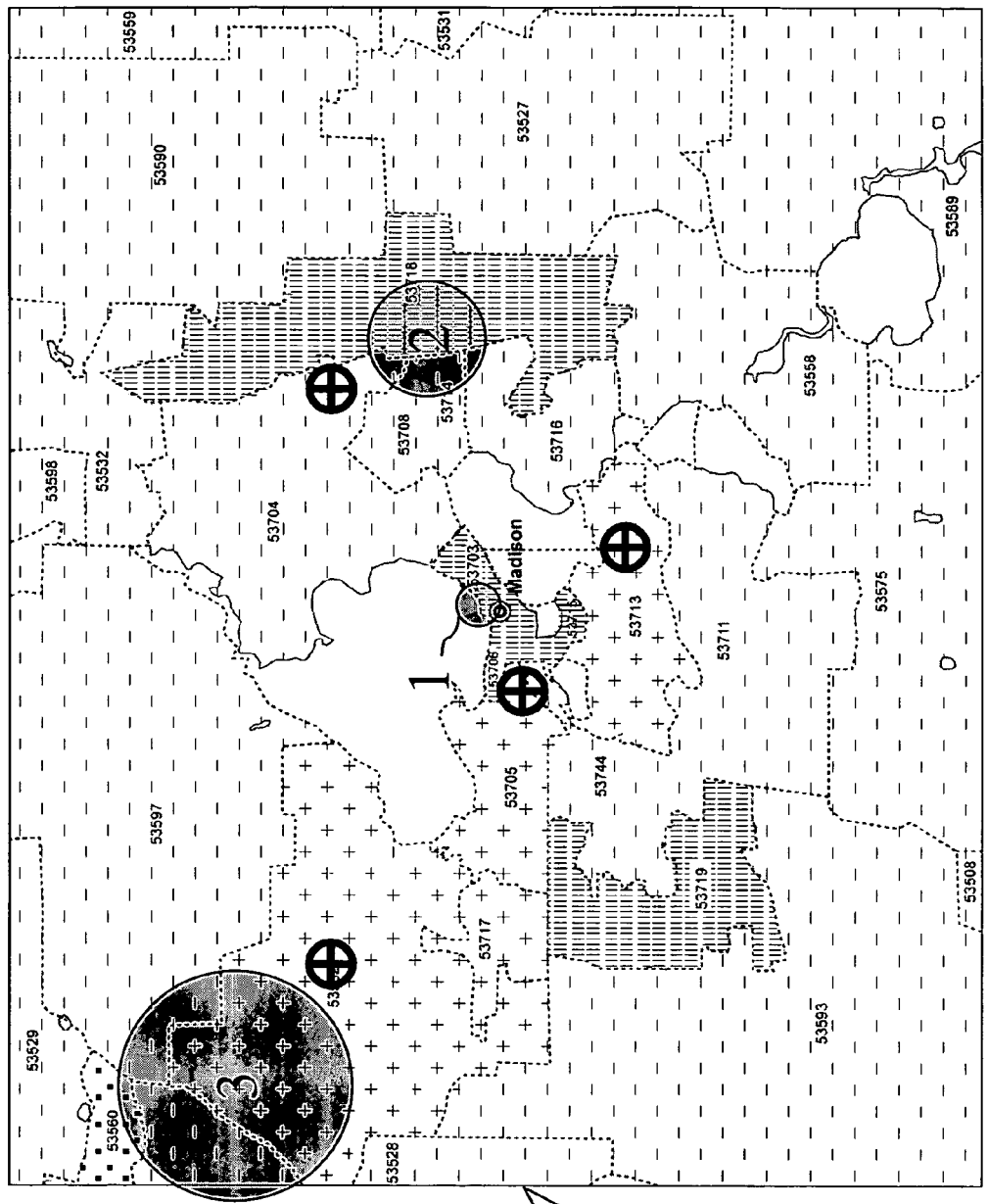

FIGS. 13 and 14 show a market share analysis, and more specifically demand and market share versus ZIP code, in accordance with one embodiment of the invention. That is, FIGS. 13 and 14 illustrate a process by which demand for goods sold by a hypothetical retailer (derived from the customer-level database) are shown as a function of ZIP code. The locations of this retailer's three franchise stores are numbered, and the locations of its major competitors are shown with crossed circles. The size of the circle represents the average distance from the store to the customer's home ZIP code (derived from store-level database). Subjectively, one can see that the location of Store 3 is not optimal, suggesting either that the store be relocated or a fourth store should be opened in the new market southeast of the current location. Analyses of these types of data can render precise forecasts of sales and market share under various scenarios.

In accordance with one embodiment of the invention, one aspect of the market share analysis processing of FIG. 13 starts in step 1300. In the process in step 1320, sales in the particular merchant's line of business is extracted based on ZIP code, i.e., the ZIP code of the merchant. Data from a peer line-of-business database 435 may be used in the processing of step 1320. Then, the process passes to step 1330.

In step 1330, the process extracts store profiles for all stores in the region of interest. Data from a store-level merchant profile database 150 is used in the processing of step 1330. This information is then used to generate a suitable data set 1340.

In parallel to the processing step 1300 of FIG. 13, in step 1315, the process starts customer demand analysis, in accordance with one embodiment of the invention. Specifically, in step 1325, sales in the merchant's line of business is extracted based on the customer home ZIP. In the processing of step 1325, customer spending profiles 125 are utilized, i.e., as such are stored in a suitable database. Data from the processing of step 1340 is also output into the data set 1340.

Thereafter, in step 1340 of FIG. 13, various reports and plots may be generated based on the data set 1340, i.e., such as shown in FIG. 14. After step 1350 of FIG. 13, the process ends.

FIG. 14 shows further aspects of market share analysis, i.e., demand and market share versus ZIP code. With reference to FIG. 14, demand for goods sold by a hypothetical retailer (derived from the customer-level database) are shown as a function of ZIP code. The locations of this retailer's three franchise stores are numbered, and the locations of its major competitors are shown with crossed circles. The size of the circle represents the average distance from the store to the customer's home ZIP code (derived from store-level database). Subjectively, one can see that the location of Store 3 is not optimal, suggesting either that the store be relocated or a fourth store should be opened in the new market southeast of the current location. Analyses of these types of data can render precise forecasts of sales and market share under various scenarios.

In further explanation of the systems and methods of the invention, as described herein, customer profiles are utilized in various aspects of the invention. Customer profiles can be obtained from a plurality of sources. One common source is demographic databases and the census bureau, which typically contain basic demographic information, such as age, income, ZIP code, home ownership, market value of home, gender, marital status, and so on. Many merchants maintain databases on their own customers, but the data is limited to that gathered by the merchant at time of sale or through questionnaires in warranty registrations. Types of information collected depend on the type of business. For example, some retailers (such as mail-order catalog and book-of-the-month clubs) maintain detailed SKU-level data on all items purchased over a year. Grocery stores collect these data through coupon-rewards programs. Airlines collect flight itineraries. Internet service providers and merchants might maintain databases containing self-reported profile information, websites visited, as well as internet purchases. Further, customer spending profiles can be derived directly from credit card transactions data itself. U.S. Pat. No. 6,505,168 to Rothman et al. (issued Jan. 7, 2003, which is incorporated herein by reference in its entirety) is illustrative of the derivation of customer spending profiles.

In accordance with a further aspect of the invention, various possible merchant analysis and potential applications are described below with reference to FIG. 15. As referenced in FIG. 15, the invention may be used to perform a wide variety of activities including, for example, the generation of customer profiles, market share analysis, inventory analysis, predicting and modeling consumer behavior, and business loan underwriting and auditing, for example. In such application of the invention to privately held companies, default, delinquency, and customer dispute histories may be used. Further, input data for the potential applications as shown in FIG. 15 might be obtained from DUN & BRADSTREET, the BETTER BUSINESS BUREAU, and/or credit card acquirers, i.e., such as PAYMENTECH, for example. These entities might provide data as desired that could be used in the systems and methods of the invention. Further, it should be appreciated that information generated from the systems and methods of the invention might be used by a credit card acquirer or other entity dealing with merchants, i.e., so as to identify questionable merchants and questionable merchant practices, for example.

Figure 16:
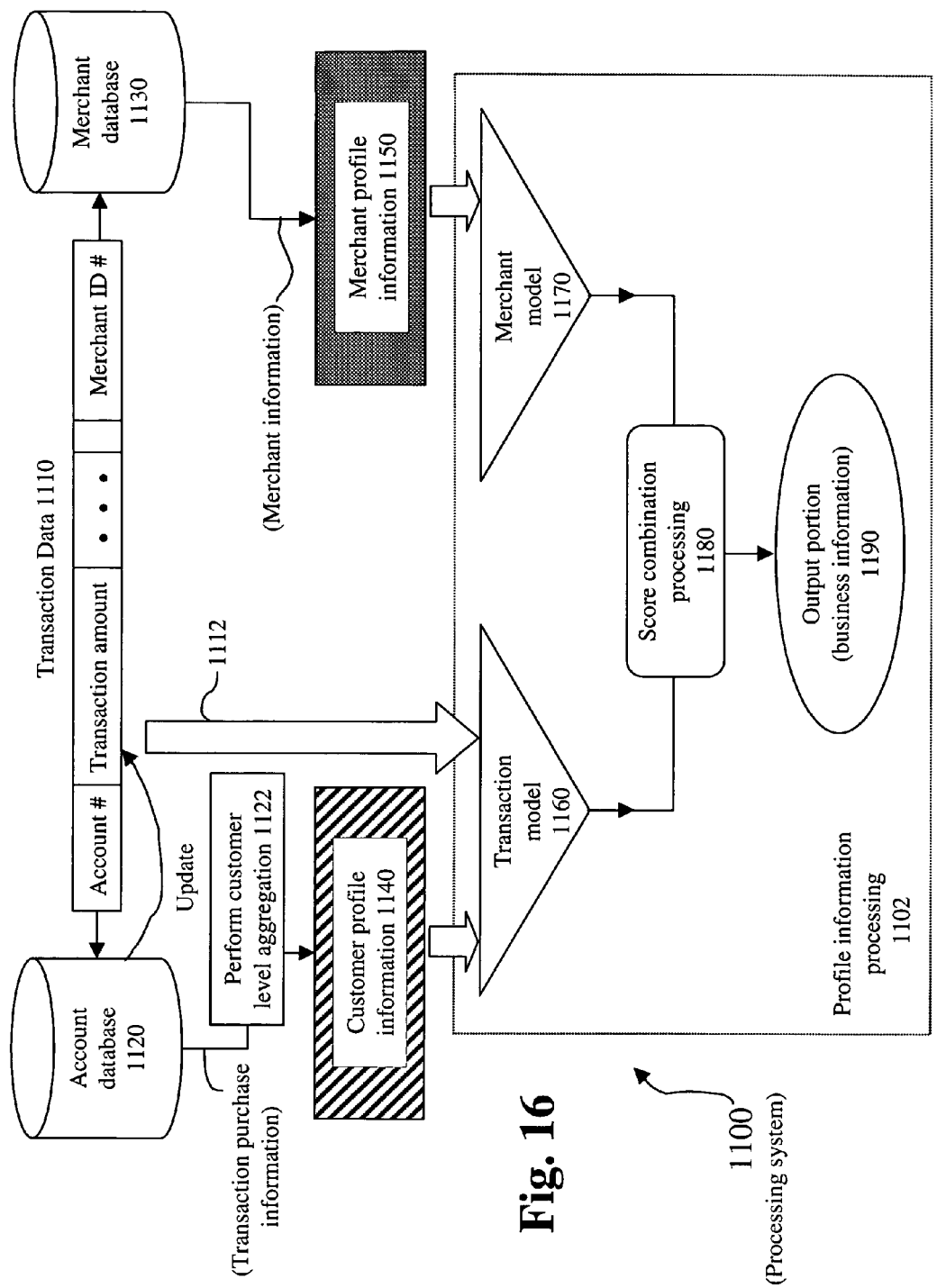
FIG. 16 is a block diagram showing a processing system in accordance with one embodiment of the invention.

In further explanation of the invention, FIG. 16 is a block diagram showing a processing system in accordance with a further embodiment of the invention. As shown in FIG. 16, various transaction data 1110 may be utilized in the method of the invention. This transaction data 1110 may be obtained from a wide variety of sources. Once obtained, merchant information is output to a merchant database 1130. The merchant information is then used to generate merchant profile information 1150. On the other hand, transaction purchase information based on the transaction data 1110 is output to an account database 1120. The transaction purchase information is utilized to generate customer profile information 1140. In accordance with one embodiment of the invention, the transaction purchase information may be aggregated at the customer level, as shown in step 1122 of FIG. 16. The customer profile information 1140 is then utilized in a transaction model 1160. Alternatively, transaction data 1110 may be output directly into the transaction model 1160, as shown by the transfer of data 1112. As shown in FIG. 16, the various information collected from transactions of a customer is aggregated at the customer level.

As shown in FIG. 16, the processing system 1100 performs various profile information processing 1102. This is performed to generate profiles for both the transaction model 1160 as well as the merchant model 1170. As a result, predictive scores based on a wide variety of variables may be generated by the transaction model 1160 relating to transaction purchase information. In a parallel manner, predictive scores based on a wide variety of variables may be generated by the merchant model 1170 based on the merchant information. As shown in block 1180 of FIG. 1, the outputs of the transaction model 1160 and the merchant model 1170 may be combined in score combination processing 1180. After combining, as shown in FIG. 1, the results of the score combination processing 1180 are output to an output portion 1190. Specifically, the output portion generates the business information as is described below.

Figure 17:
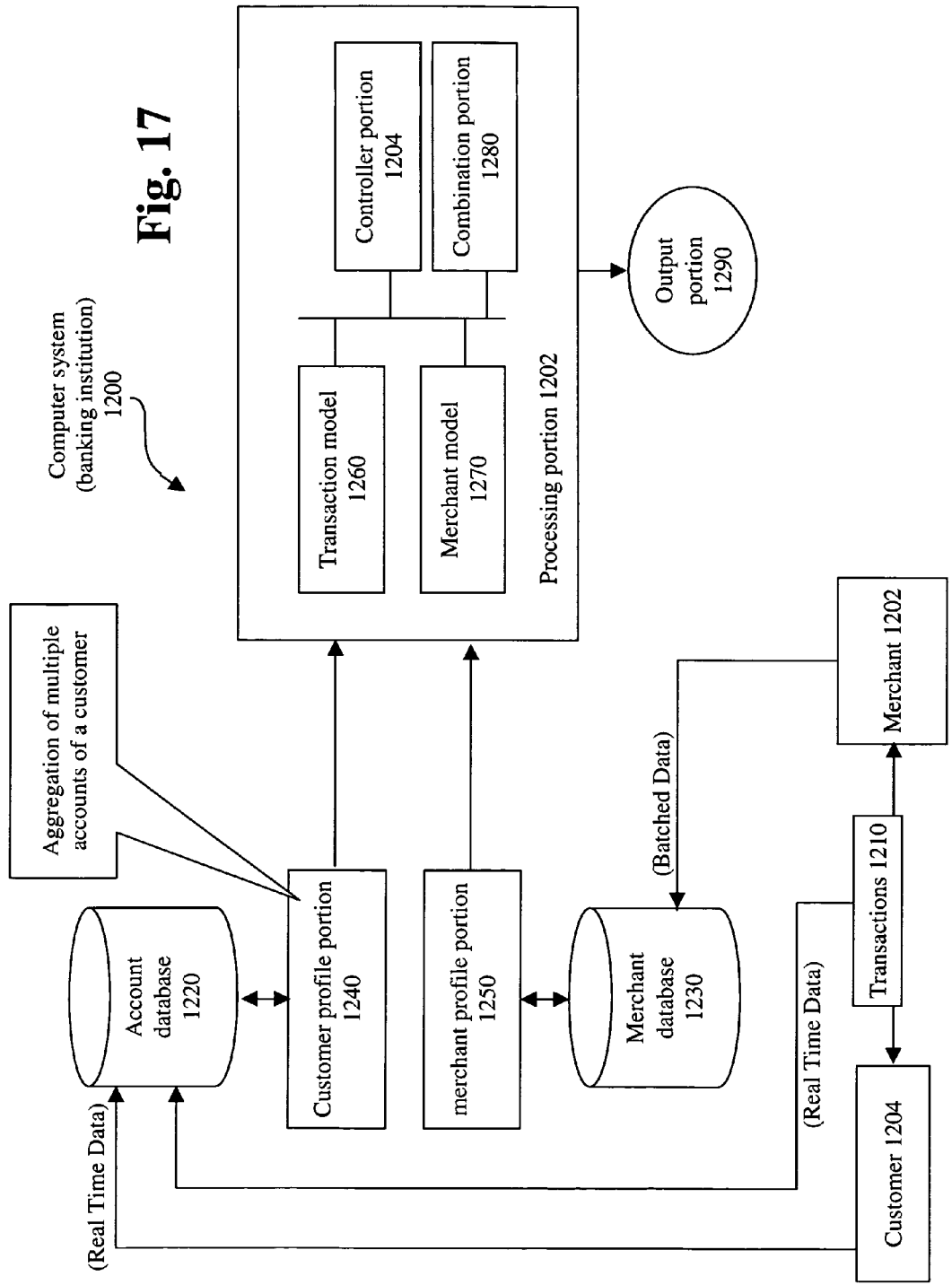
FIG. 17 is a block diagram showing a further processing system in accordance with one embodiment of the invention.

FIG. 17 is a block diagram showing a computer system 1200 in accordance with a further embodiment of the invention. For example, the computer system 1200 might be maintained by a banking institution. The computer system 1200 utilizes information based on transactions 1210. These transactions 1210 relate to a customer 1204 dealing with a merchant 1202. The merchant may be any of a wide variety of entities dealing with the sale of products or dealing in services, for example. Information regarding a merchant 1202 is output to a merchant database 1230 as a result of a transaction. For example, the merchant information might be output as batched data in a periodic manner as is desired or necessary. Further, information relating to the customer 1204 may be output to an account database 1220 in a real time manner.

Once the merchant information is available in the merchant database 1230 and the account information is available in the account database 1220, this information is utilized in the processing of the invention. Specifically, a customer profile portion 1240 utilizes the account information in the account database 1220 to generate customer profiles, as desired. The customer profiles could of course be based on a variety of accounts of a particular customer, for example. Further, merchant profile portion 1250 utilizes merchant information in the merchant database 1230. The customer profile portion generates customer profile information based on customer information obtained. Further, the merchant profile portion 1250 generates merchant profile based on batched data obtained from merchants. As shown in FIG. 17, the profile information is output to a processing portion 1220. In particular, the processing portion 1202 includes a transaction model 1260 as well as a merchant model 1270, in a similar manner to FIG. 16 discussed above. The transaction model 1260 may be used to generate a variety of output information based on the data in the customer profile portion. Further, the merchant model 1270 may be used to generate a variety of output information based on the data in the merchant profile portion. Additionally, the processing portion 1202 includes a control portion 1204 which controls overall operations of the processing portion 1202. The processing portion 1202 outputs information to an output portion 1290.

As shown in FIG. 17, the processing portion 202 also includes a combination portion 1280. The combination portion 1280 combines the data generated by the transaction model 1260 and the merchant model 1270. Accordingly, the operation of the combination portion 1280 results in a variety of data regarding a merchant and either current or potential customers of that merchant, for example. The processing systems of FIGS. 16 and 17 may be used to practice the various embodiments of the invention as described below.

Figure 18:
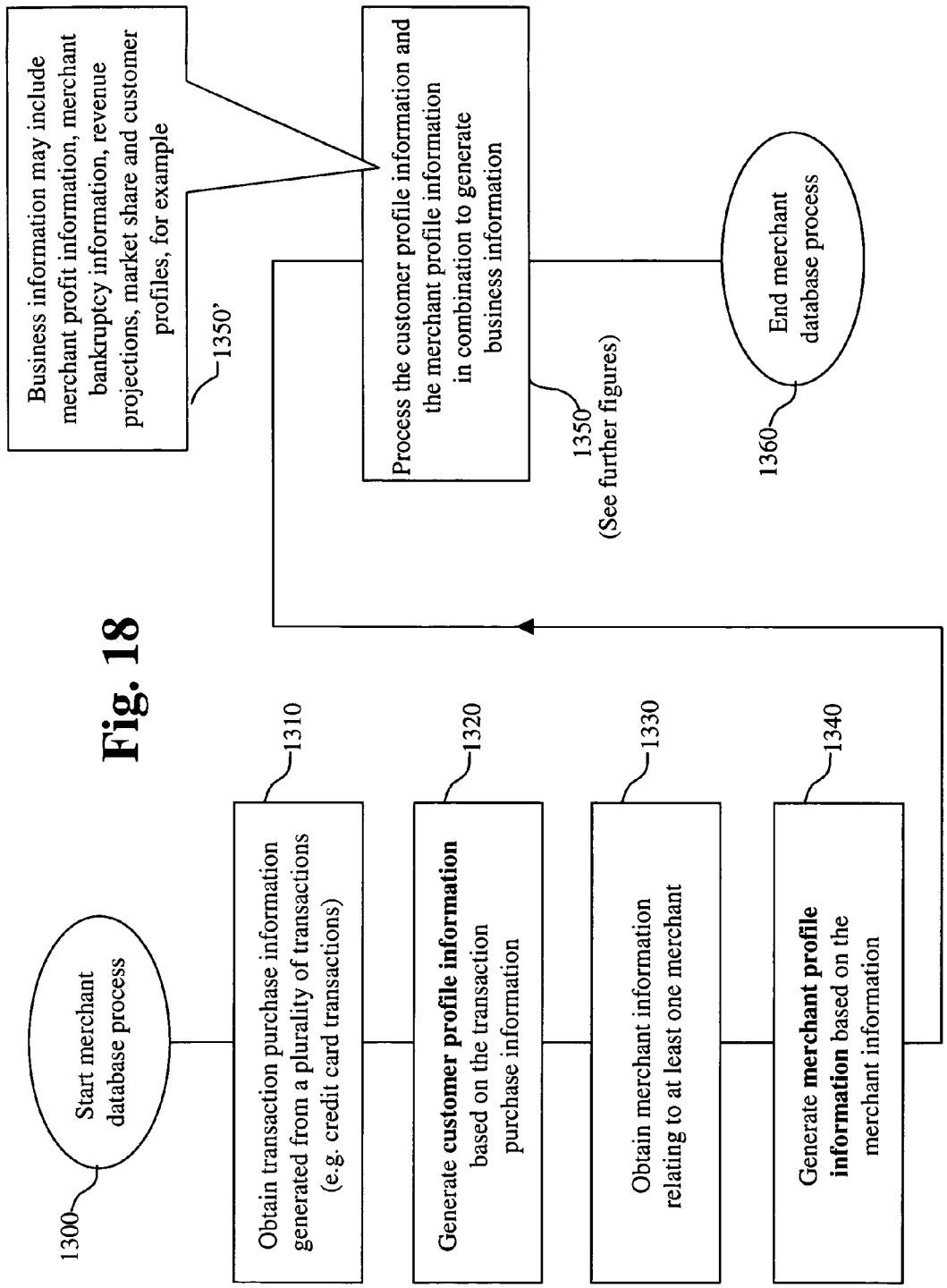
FIG. 18 is a flowchart showing a merchant database process in accordance with one embodiment of the invention.

FIG. 18 is a flowchart showing a merchant database process 300 in accordance with one embodiment of the invention. As shown in FIG. 18, the process starts in step 1300 and passes to step 1310. In step 1310, transaction purchase information generated from a plurality of transactions is obtained. For example, such purchase information might include credit card transactions. Then, in step 1320, the process generates customer profile information based on the transaction purchase information. After step 1320, the process passes to step 1330. In step 1330, the process obtains merchant information relating to at least one merchant. Then, the process passes to step 1340. In step 1340, the process generates merchant profile information based on the merchant information.

After step 1340, the process passes to step 1350. In step 1350, the customer profile information is processed in combination to generate business information. Further details of step 1350 are described below. As indicated in box 350', the business information may include merchant profit information, merchant bankruptcy information, revenue projections, market share and customer profiles, for example.

With further reference to FIG. 18, after step 1350, the process passes to step 1360. In step 1360, the merchant database process ends.

Figure 19:
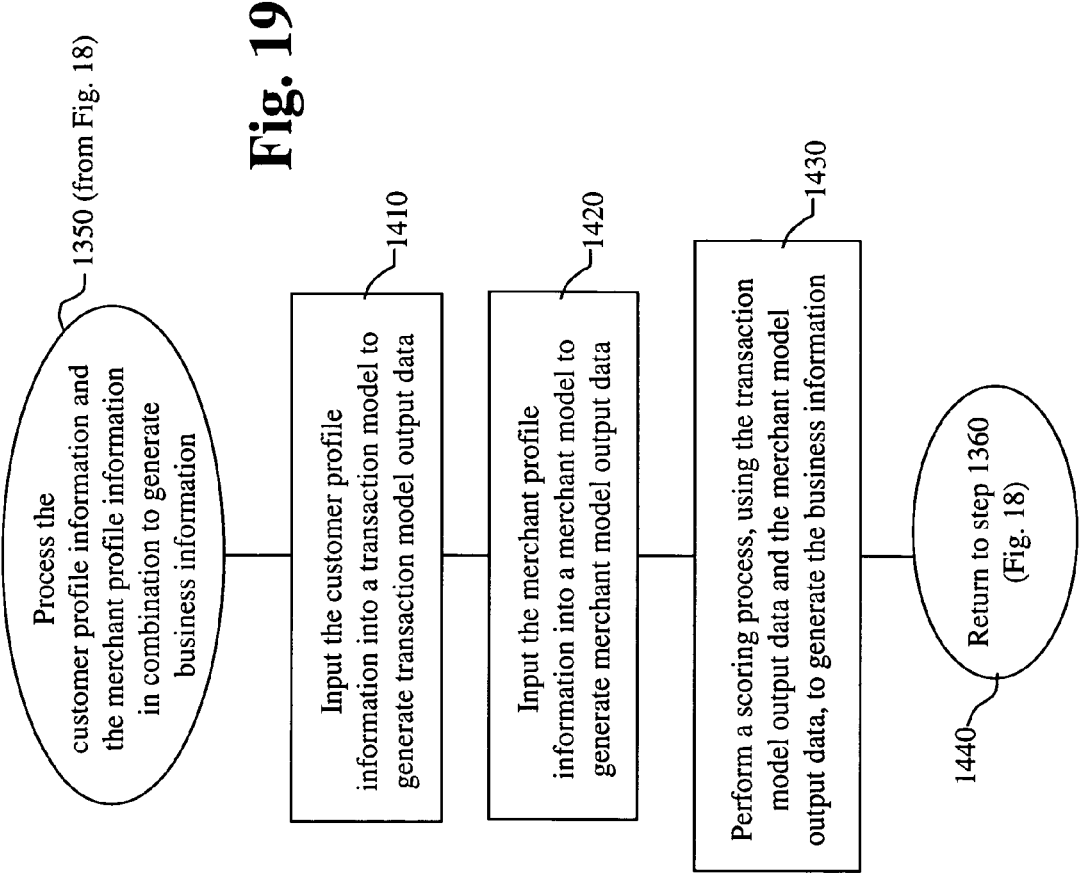
FIG. 19 is a flowchart showing the process the customer profile information and the merchant profile information in combination to generate business information step of FIG. 18 in further detail in accordance with one embodiment of the invention.

FIG. 19 is a flowchart showing in further detail the process the customer profile information and the merchant profile information in combination to generate business information step 1350 of FIG. 18. As shown in FIG. 19, after step 1350, the process passes to step 1410. In step 1410, the process inputs the customer profile information into a transaction model to generate transaction model output data. Then, in step 1420, the process inputs the merchant profile information into a merchant model to generate merchant model output data. Then the process passes to step 1430.

In step 1430, the process performs a scoring process to generate the business information. Specifically, the scoring process uses a transaction model output data and the merchant model output data. After step 1430, the process passes to step 1440. In step 1440, the process returns to step 1360 of FIG. 18.

Figure 20:
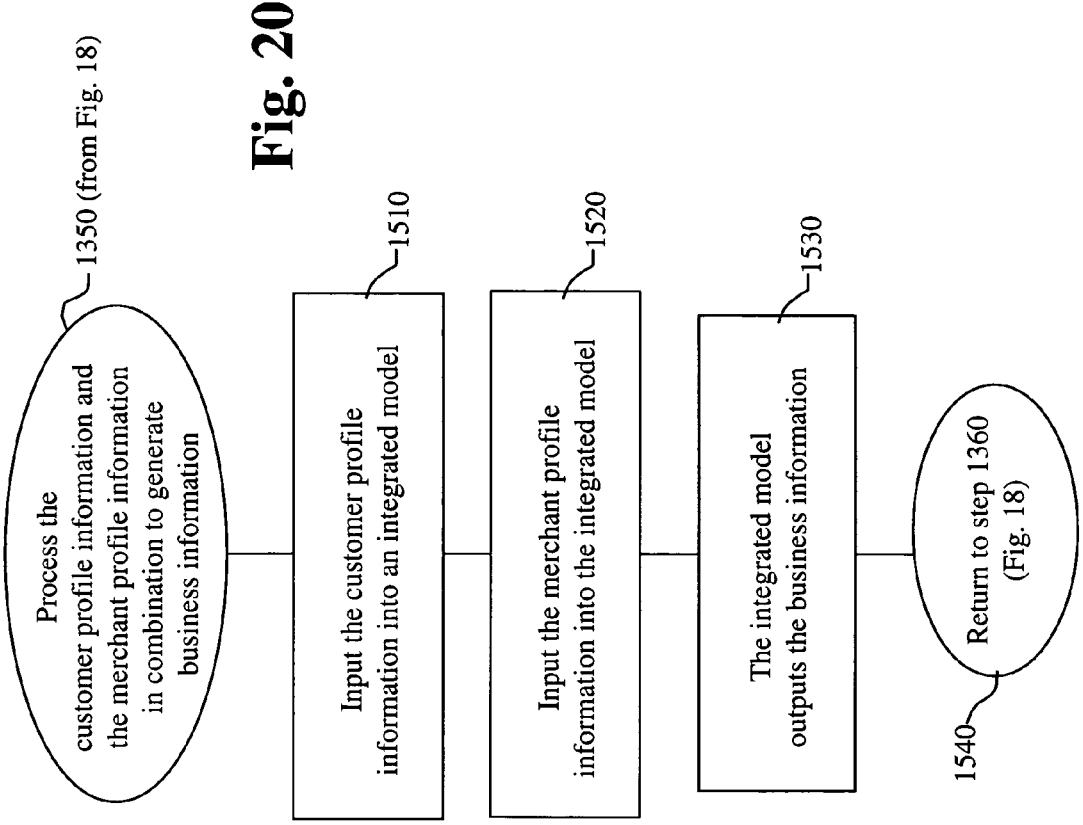
FIG. 20 is a flowchart showing the process the customer profile information and the merchant profile information in combination to generate business information step of FIG. 18 in further detail in accordance with one embodiment of the invention.

FIG. 20 is a flowchart showing in further detail step 1350 of FIG. 18. As shown in FIG. 20, the process passes from 350 to step 1510. In step 1510, the process inputs the customer profile information into an integrated model. Then, in step 1520, the process inputs the merchant profile information into the integrated model. Thereafter, the process passes to step 1530. In step 1530, the integrated model outputs the business information. Accordingly, FIG. 20 reflects processing of the customer profile information and the merchant profile information using an integrated model. After step 1530, the process passes to step 1540. In step 1540, the process returns to step 1360 of FIG. 18.

Figure 21:
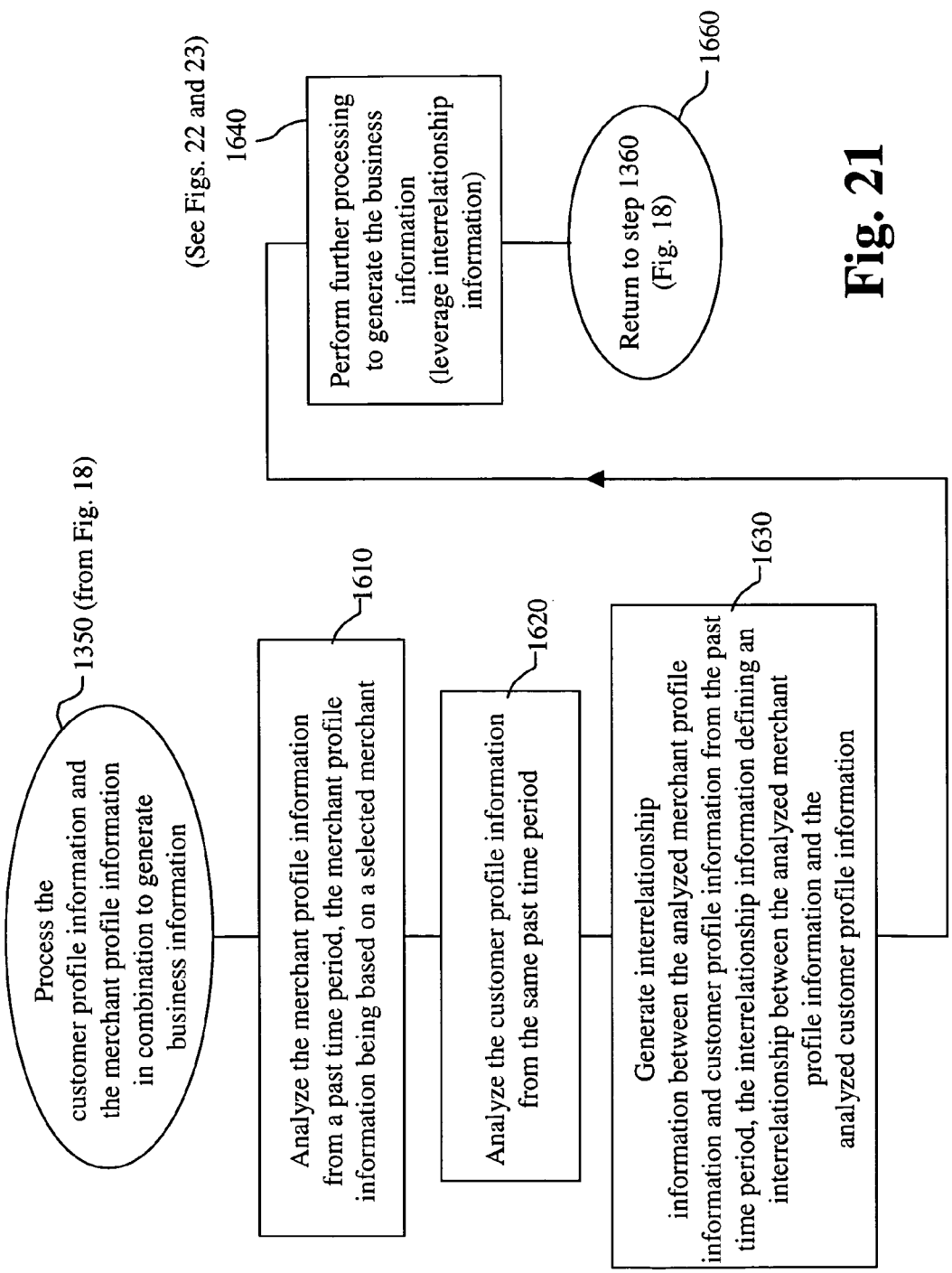
FIG. 21 is a flowchart showing the process the customer profile information and the merchant profile information in combination to generate business information step of FIG. 18 in further detail in accordance with one embodiment of the invention.

FIG. 21 is a flowchart showing in further detail the process the customer profile information and the merchant profile information in combination to generate business information step 1350 of FIG. 18. As shown in FIG. 21, the process starts in step 1350 and passes to step 1610.

In step 1610, the process analyzes the merchant profile information from a past time period wherein the merchant profile information is based on a selected merchant. After step 1610, the process passes to step 1620. In step 1620, the process analyzes the customer profile information from the same past time period. Then, in step 1630, the process generates an interrelationship information between the analyzed merchant profile information and the customer profile information from the past time period.

Accordingly, the interrelationship information defines an interrelationship between the analyzed merchant profile information and the analyzed customer profile information. Then, in step 1640, the process performs further processing to generate the business information. That is, the process leverages the interrelationship information obtained in step 1630. Further details of step 1640 are described below in reference to FIGS. 7 and 8. After step 1640 of FIG. 21, the process passes to step 1660. In step 1660, the process returns to step 1360 of FIG. 18.

Figure 22:
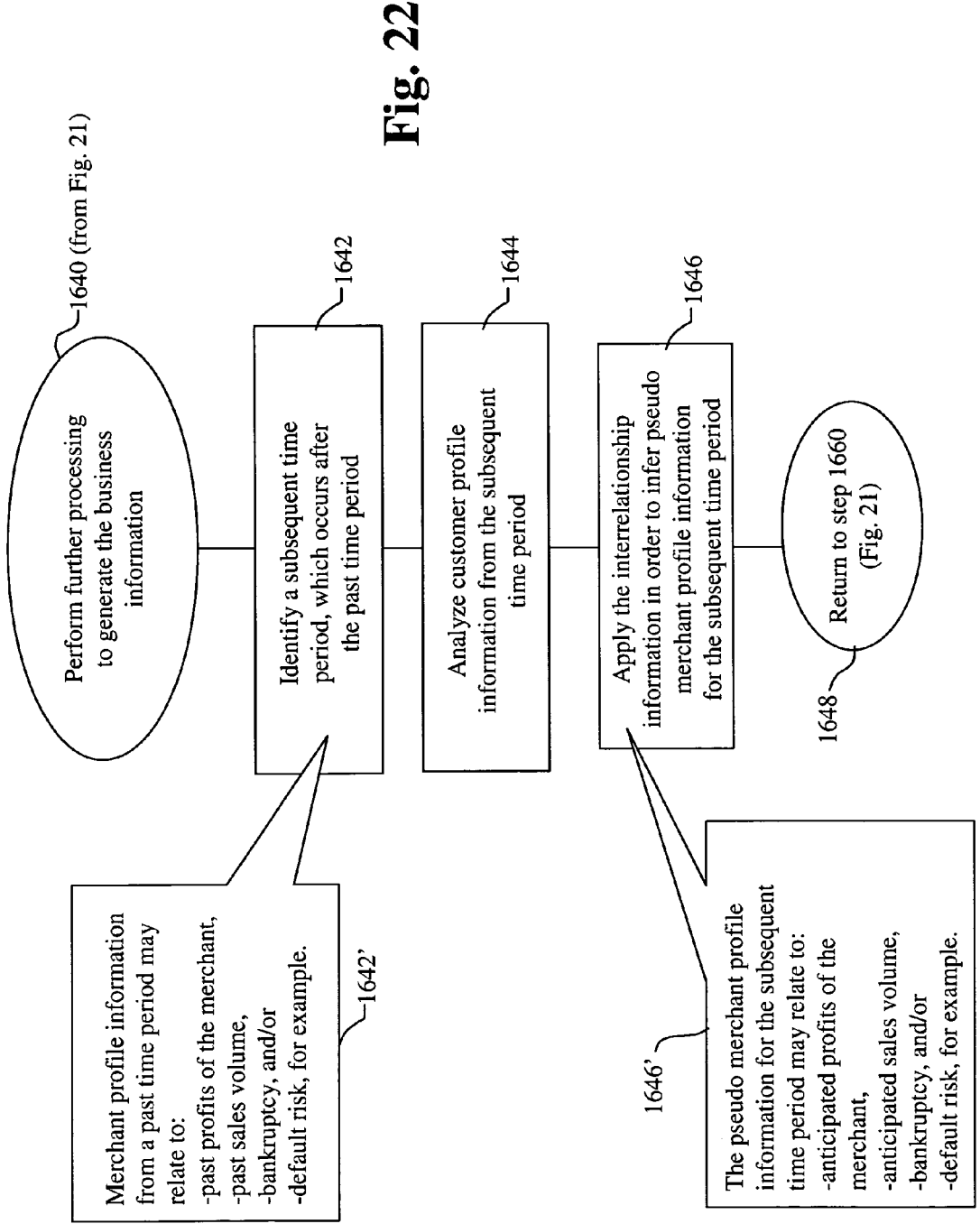
FIG. 22 is a flowchart showing the perform further processing to generate the business information step of FIG. 21 in further detail in accordance with one embodiment of the invention.

FIG. 22 is a flowchart showing in further detail the perform further processing to generate the business information step 1640 of FIG. 21. As shown in FIG. 22, the process starts in step 1640 and passes to step 1642. In step 1642, the process identifies a subsequent time period, which occurs after the past time period. As shown in block 1642', the merchant profile information from a past time period may relate to past profits of the merchant, past sales volume, bankruptcy, and/or default risk, for example. As shown in FIG. 22, after step 1642, the process passes to step 1644. In step 1644, the process analyzes the customer profile information from the subsequent time period. Then, in step 1646, the process applies the interrelationship information in order to infer pseudo merchant profile information for the subsequent time period, i.e., merchant profile information that is based essentially on a extrapolation into the subsequent time period.

As shown in block 1646', the pseudo merchant profile information for the subsequent time period may relate to anticipated profits of the merchant, anticipated sales volume, bankruptcy, and/or default risk, for example. As shown in FIG. 22, after step 1646, the process passes to step 1648. In step 1648, the process returns to step 1660 of FIG. 21.

Figure 23:
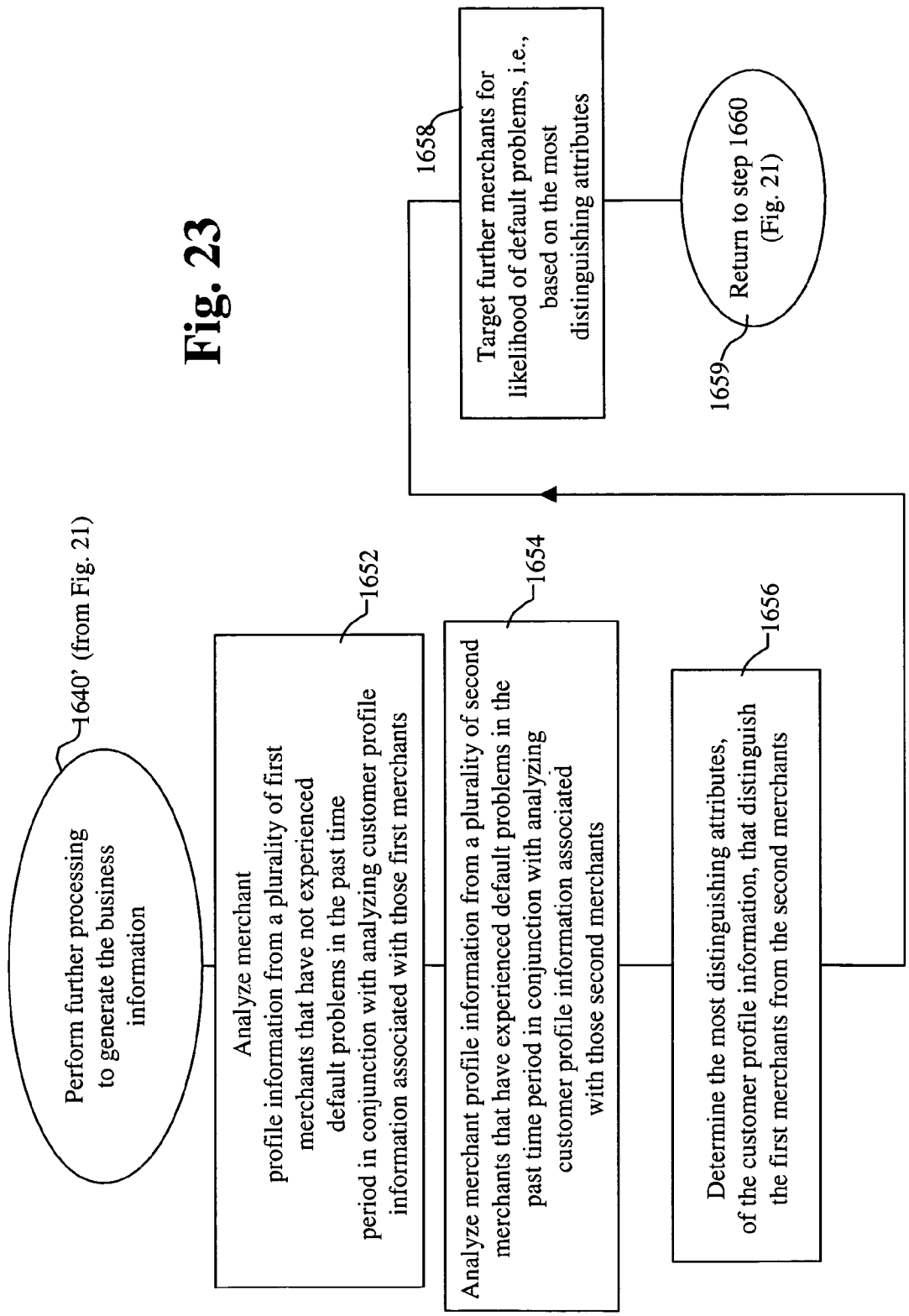
FIG. 23 is a flowchart showing the perform further processing to generate the business information step of FIG. 21 in further detail in accordance with one embodiment of the invention.

FIG. 23 is a flowchart showing in further detail the perform further processing to generate business information step 1640 of FIG. 21. As shown in FIG. 23, the process starts in step 1640' and passes to step 1652. In step 1652, the process analyzes the merchant profile information from a plurality of first merchants that have not experienced fraud in the past time period in conjunction with analyzing customer profile information associated with those first merchants. Then, in step 1654, the process analyzes merchant profile information from a plurality of second merchants that have experienced default problems in the past time period in conjunction with analyzing customer profile information associated with those second merchants.

After step 1654, in step 1656, the process determines the most distinguishing attributes, i.e., of the customer profile information, that distinguish the first merchants from the second merchants. After step 1656, the process passes to step 1658. In step 1658, the process targets the further merchants for likelihood of default problems. That is, the process identifies such further merchants as being likely targets for default problems based on the most distinguishing attributes. After step 1658, the process passes to step 1659. In step 1659, the process returns to step 1660 of FIG. 21.

Figure 24:
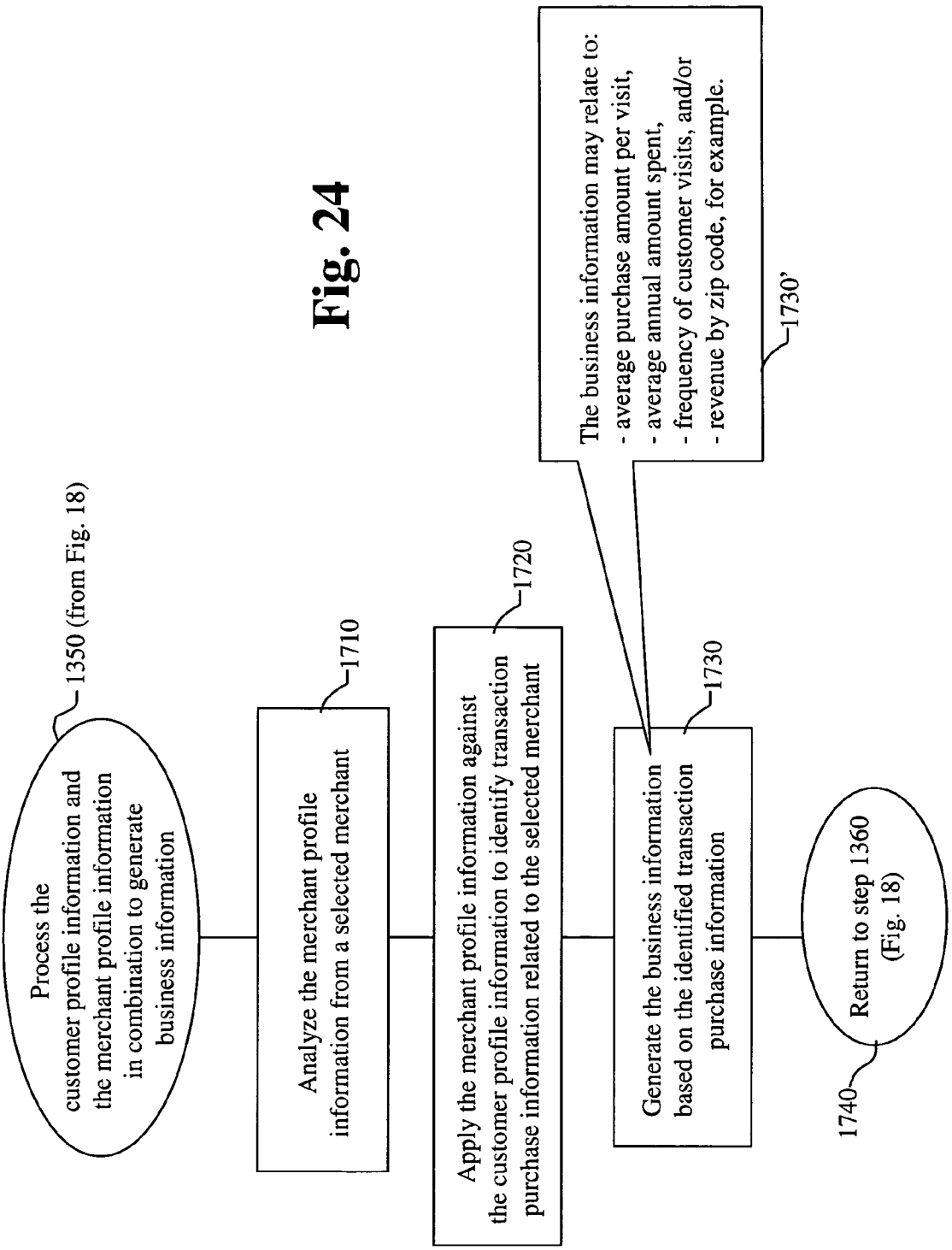
FIG. 24 is a flowchart showing the process the customer profile information and the merchant profile information in combination to generate business information step of FIG. 18 in further detail in accordance with one embodiment of the invention.

FIG. 24 is a flowchart showing in further detail the process the customer profile information and the merchant profile information in combination to generate business information step 1350 of FIG. 18 in further detail in accordance with one embodiment of the invention.

As shown in FIG. 24, after step 1350, the process passes to step 1710. In step 1710, the process analyzes the merchant profile information from a selected merchant. Then, in step 1720, the process supplies the merchant profile information against the customer profile information to identify transaction purchase information related to the selected merchant. Then, the process passes to step 1730. In step 1730, the process generates the business information based on the identified transaction purchase information. As shown in block 1730', the business information may relate to average purchase amount per visit, average annual amount spent, frequency of customer visits, and/or revenue by zip code, for example. As shown in FIG. 24, after step 1730, the process passes to step 1740. In step 1740, the process returns to step 1360 of FIG. 18.

Figure 25:
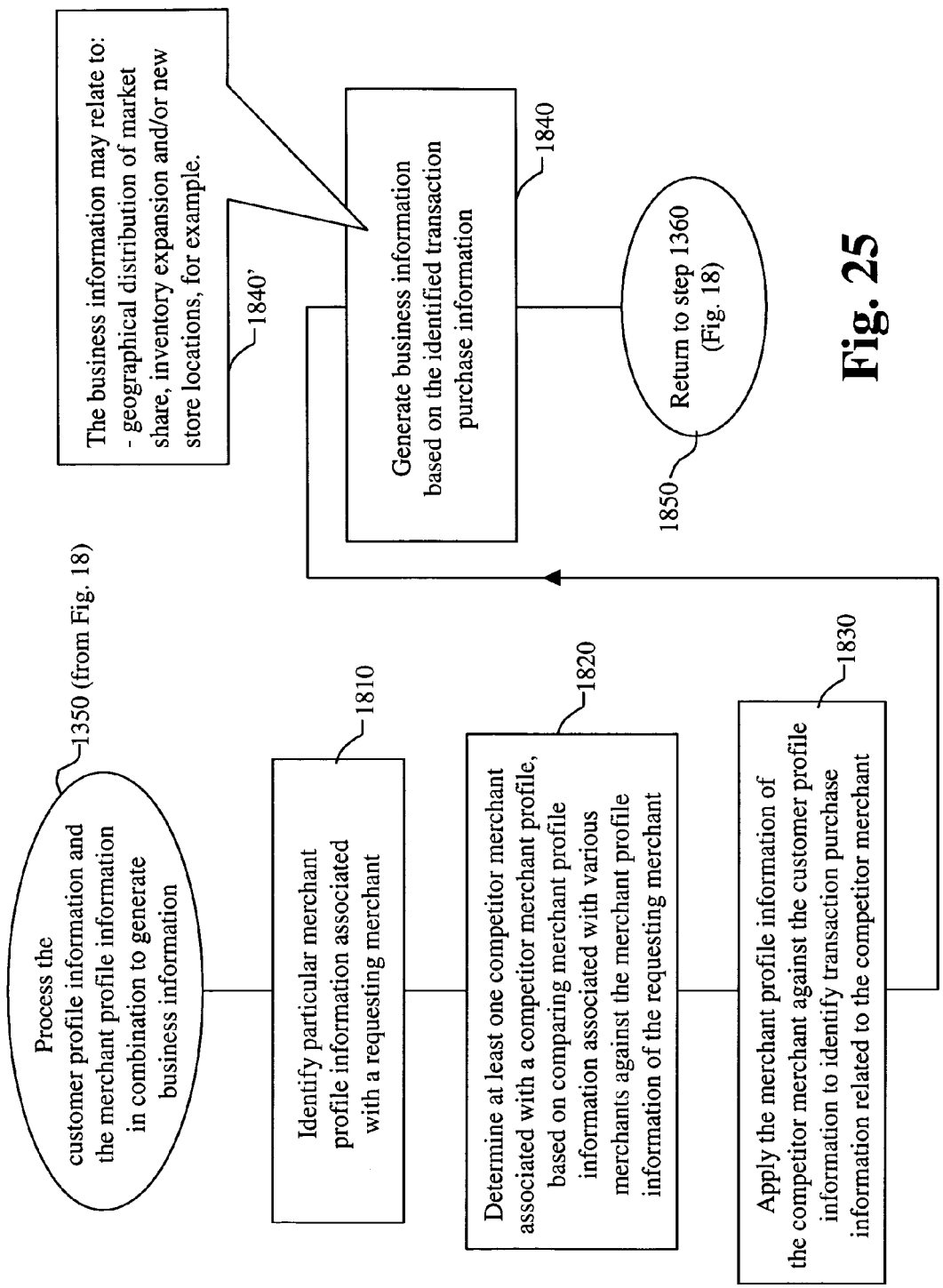
FIG. 25 is a flowchart showing the process the customer profile information and the merchant profile information in combination to generate business information step of FIG. 18 in further detail in accordance with one embodiment of the invention.

FIG. 25 is a flowchart showing in further detail the process the customer profile information and the merchant profile information in combination to generate business information step 1350 of FIG. 18. As shown in FIG. 25, the process passes from step 1350, to step 1810. In step 1810, the process identifies particular merchant profile information associated with a requesting merchant. Then the process passes to step 1820. In step 1820, the process determines at least one competitor merchant associated with a competitor merchant profile based on comparing merchant profile information associated with various merchants against the merchant profile information of the requesting merchant. Then, in step 1830, the process applies the merchant profile information of the competitor merchant against the customer profile information to identify transaction purchase information related to the competitor merchant. Then the process passes to step 1840.

In step 1840, the process generates business information based on the identified transaction purchase information. As shown in box 1840', the business information may relate to geographical distribution of market share, inventory expansion and/or new store locations, for example. After step 1840, the process passes to step 1850. In step 1850, the process returns to step 1360 of FIG. 18.

Figure 26:
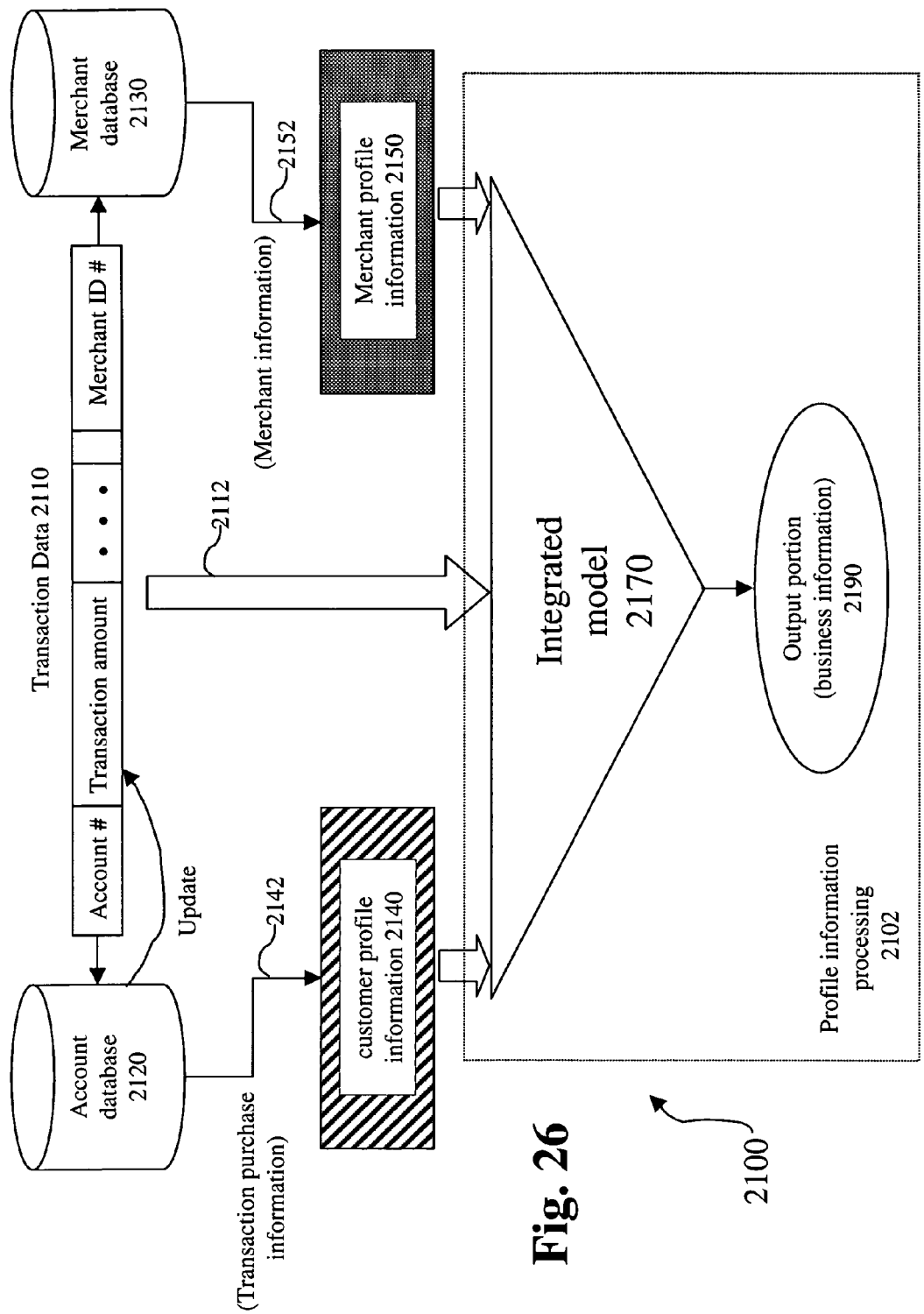
FIG. 26 is a block diagram showing a merchant database process using an integrated model in accordance with one embodiment of the invention.

FIG. 26 shows a processing system 2100 performing profile information processing 2102 in accordance with a further embodiment of the invention. As described above, in reference to FIG. 16, the system 2100 of FIG. 26 uses transaction data 2110 to populate account database 2120 and merchant database 2130. As shown by processing 2142, transaction purchase information is input into the customer profile information 2140. Further, as shown by the processing 2152, merchant information is input into the merchant profile information 2150.

In particular, FIG. 26 shows the use of an integrated model to process customer profile information 2140 and merchant profile information 2150. That is, the integrated model 2170 processes the customer profile information 2140 and merchant profile information 2150 collectively, in contrast to the separate processing of FIGS. 16 and 17 above. The integrated model 2170 may input, output and process any of a variety of variables as is desired, i.e., so as to yield desired information. For example, as shown in FIG. 26, the integrated model 2170 may output business information to an output portion 2190.

In accordance with one aspect of the invention and as otherwise described herein, it is appreciated that information about a particular merchant may be collected from a variety of sources in implementation of the systems and methods of the invention. One way that a particular merchant may be identified is using a merchant ID or key of the particular merchant. However, the merchant ID number for a particular merchant may be inconsistent. That is, the merchant ID may not be standardized across acquirers and/or there may be multiple merchant IDs for one merchant. For example, some merchants have a single ID number for the entire chain and others for each store or for each point of sale (POS) device. Accordingly, this situation might be overcome by utilizing a lookup table that associates all the known merchant IDs of a particular merchant with a single merchant. Alternatively, other schemes might be used to recognize that different indicia indeed corresponds to the same merchant. For example, the (acquirerID+merchantID) might be used, the (merchant SIC+First 6 characters of merchant description) might be used and/or the (SIC+ZIP) might be used for individual store locations.

In accordance with a further aspect of the invention, it is appreciated that a suitable time scale might be used. To explain, characteristics of merchants do not change rapidly, i.e., as compared to credit card account information, for example. Detection of many account-level events requires account profiles to be updated daily (e.g. risk models) or even after each transaction (fraud models). On the other hand, the most timely information we might want to track on merchants (such as Point-of-compromise) may need only to be updated on a weekly cycle, due to delays in fraud reporting. Further, for most other applications (inventory or volume analyses, channel volumes, and so on), monthly updates may well be more than sufficient.

This difference in time scales greatly simplifies the design of integrated models, i.e., models incorporating both account and merchant profiles. That is, account-level profiles can, as before, be updated in real time (with each transaction, if necessary), while variables based on merchant-level information can be updated in batch mode on a monthly cycle.

Hereinafter, further aspects of the variables that may be used in the systems and methods of the invention, as well as information obtained from those variables, will be described in further detail. In accordance with further aspects of the invention related to the above, FIG. 15 is further illustrative of merchant analysis and potential applications of the invention. Also, further aspects of variables of interest are described below. For example, gross merchant variables might be used including Merchant SIC codes, Merchant tenure (months in business), and franchise (multiple location) and link to parent company information.

Further, as is also discussed above, transaction-summary variables may be used in the processing of the invention including average and standard deviation of transaction amount, average and standard deviation of transaction frequency, Total transaction amount (over a period of time), Seasonal frequency vs.-month, average and standard deviation of distance from customer's home address, percent transactions in which the card is not present including recurring payments, MOTO, Internet, e-payment. Further transaction summary variables that might be used include the percent approved/declined, and the percent keyed/swiped.

In further explanation of the above description, customer demographics may be used. To explain further, since transaction data is linked to individual account numbers, key demographics (home ZIP, age, income, credit score, home ownership, etc.) corresponding to account number can be appended to transaction data. Gross statistics on customer demographics (e.g. average and standard deviation of customer age) could then be computed in the same way as gross statistics on transaction amounts. Collectively, these statistics would then constitute a demographic "profile" of the merchant's customer base. This profile could then be used to define target populations for marketing campaigns. A list of potential customer demographics includes a variety of variables of which average, standard deviation and/or complete distribution parameters may be used. These variables may include ZIP code, customer age, income, credit risk, NPV, wealth, size, pet owner, own/rent, ages of children, occupation, recent mover, life events and/or customer spending attributes.

Further, other variables that might be utilized in the processing of the invention include outcome-based variables. These variables might include % chargebacks, customer default/bankruptcy that may require account-level flags, merchant default/bankruptcy/delinquency that may require merchant-level flags; merchant profit or revenue or credit rating which may require public records and/or Dun & Bradstreet reports.

Further, account-level or customer-level variables might be used, such as customer loyalty. A simple variable that can be calculated at the merchant-level is the average number of transactions/customer at each store. This could be calculated directly for each account in a transaction database, or as the ratio of number of transactions/time and number of unique account numbers/time.

More generally, a merchant may be interested in the distribution of their repeat customers, i.e., such as in a histogram of the number of transactions per customer at each store. Collecting these data for all merchants in the database might be computationally expensive. However, a secondary engine can be developed to "drill down" to analyze transactions only on accounts that had at least one transaction at the merchant of interest. A second round of processing could then be conducted at the account-level.

In accordance with the various embodiments of the invention described above, customer profiles may be generated and utilized, as desired. The particular method used to generate customer profile or profiles will of course vary depending on the particular situation. Further, it should be appreciated that various methods may be used to effect dimension reduction, including dimension reduction on customer profiles. For example, techniques for generating customer profiles and for performing dimension reduction may be used in the present invention as described in U.S. patent application Ser. No. 10/638,643 filed Aug. 12, 2003 and U.S. patent application Ser. No. 10/638,648 filed Aug. 12, 2003, which are both incorporated herein by reference in their entirety.

As described herein, a wide variety of information may be used in the practice of the various embodiments of the systems and methods of the invention. It is of course appreciated that the use and/or dissemination of some of such information may well be limited by confidentiality limitations. Further, there may be other limitations on the use and/or dissemination of such information. For example, agreements between partners in business or competitors may limit the use and/or dissemination of some information. Such considerations should of course be taken into account in the practice of the invention.

Hereinafter, general aspects of possible implementation of the inventive technology will be described. Various embodiments of the inventive technology are described above. In particular, various steps of embodiments of the processes of the inventive technology are set forth. Further, various illustrative operating systems are set forth. It is appreciated that the systems of the invention or portions of the systems of the invention may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above in the flowcharts. Such a set of instructions for performing a particular task may be characterized as a program, software program, or simply software.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general-purpose computer. However, the processing machine described above may also utilize any of a wide variety of other technologies including a special purpose computer, a computer system including a microcomputer, mini-computer or mainframe for example, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the process of the invention.

It is appreciated that in order to practice the method of the invention as described above, it is not necessary that the processors and/or the memories of the processing machine be physically located in the same geographical place. That is, each of the processors and the memories used in the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described above is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, or any client server system that provides communication, for example. Such communications technologies may use any suitable protocol such as TCP/IP, UDP, or OSI, for example.

As described above, a set of instructions is used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications and equivalent arrangements.

What is claimed is:

1. A method, in a computer system for storing and manipulating transaction data including transaction purchase information, customer demographics information, and merchant information, the computer system comprising a storage device for storing the transaction data and a processor for processing the transaction data, the method comprising:

obtaining, by the computer system, transaction purchase information generated from a plurality of sources;

generating, by the computer system, customer profile information based on the transaction purchase information;

obtaining, by the computer system, merchant information relating to at least one merchant;

generating, by the computer system, merchant profile information based on the merchant information and transaction purchase information;

processing, by the computer system, the customer profile information and the merchant profile information in combination to generate business information; and wherein the business information includes at least one selected from the group consisting of merchant profit information, merchant bankruptcy information, merchant revenue, merchant profit projections, and merchant market share;

wherein the processing the customer profile information and the merchant profile information in combination to generate business information includes:

analyzing the merchant profile information from a past time period, the merchant profile information being based on a selected merchant;

analyzing the customer profile information from the same past time period; and generating interrelationship information between the analyzed merchant profile information and customer profile information from the past period time, the interrelationship information defining an interrelationship between the analyzed merchant profile information and the analyzed customer profile information; and wherein the processing profile information and the merchant profile information in combination to generate business information further includes:

identifying a subsequent time period, which occurs after the past time period;

analyzing customer profile information from the subsequent time period; and applying the interrelationship information in order to infer pseudo merchant profile information for the subsequent time period.

2. The method of claim 1, wherein the transaction purchase information is generated based on at least one selected from the group consisting of credit card activity, debit card activity, checking activity, and ACH transaction activity of consumers.

3. The method of claim 1, wherein the computer system is maintained and the method is effected by a banking institution or transaction processor.

4. The method of claim 1, wherein the transaction purchase information is generated based on at least one selected from the group consisting of stored value card activity and internet payment activity.

5. The method of claim 1, the computer system including a transaction model and a merchant model, and wherein the processing the customer profile information and the merchant profile information in combination to generate business information includes:

inputting the customer profile information into the transaction model, the computer system using the transaction model to generate transaction model output data;

inputting the merchant profile information into the merchant model, the computer system using the merchant model to generate merchant model output data; and performing a scoring process, using the transaction model output data and the merchant model output data, to generate the business information.

6. The method of claim 1, wherein the processing the customer profile information and the merchant profile information in combination to generate business information includes:

inputting the customer profile information into an integrated model;

inputting the merchant profile information into the integrated model; and wherein the integrated model outputs the business information.

7. The method of claim 1, wherein:

the merchant profile information from a past time period relates to profits of the selected merchant in the past period of time; and the pseudo merchant profile information for the subsequent time period relates to anticipated profits of the selected merchant in the subsequent period of time.

8. The method of claim 1, wherein:

the merchant profile information from a past time period relates to sales volume of the selected merchant in the past period of time; and the pseudo merchant profile information for the subsequent time period relates to sales volume of the selected merchant in the subsequent period of time.

9. The method of claim 8, wherein the sales volume relates to a particular type of merchandise.

10. The method of claim 8, wherein the sales volume relates to a particular product.

11. The method of claim 1, wherein:

the merchant profile information from a past time period relates to bankruptcy related attributes of the selected merchant in the past period of time, the selected merchant having declared bankruptcy proximate to the past period of time; and the pseudo merchant profile information for the subsequent time period relates to sales bankruptcy related attributes of a further merchant in the subsequent period of time.

12. The method of claim 11, wherein:

the customer profile information from a past time period relates to bankruptcy related attributes of customer profile information, which are associated with the selected merchant in the past period of time; and the customer profile information for the subsequent time period relates to sales bankruptcy related attributes of customer profile information, which are associated with the further merchant in the subsequent period of time.

13. The method of claim 1, wherein:

the merchant profile information from a past time period relates to payment default risk data of the selected merchant in the past period of time; and the pseudo merchant profile information for the subsequent time period relates to payment default risk data of the selected merchant in the subsequent period of time.

14. The method of claim 1, wherein the customer profile information is information from at least one selected from the group consisting of credit card activity, debit card activity, stored value card activity, internet payment activity, checking activity, wireless payment activity and ACH transaction activity of consumers.

15. The method of claim 1, wherein the interrelationship information is based on corresponding predetermined attributes of the customer profile information and the merchant profile information.

16. The method of claim 1, wherein generating an interrelationship between the analyzed merchant profile information and customer profile information from the period of time is performed using a model.

17. The method of claim 1, wherein:

the transaction purchase information is stored in an account database, the account database being updated with further transaction information in real time based on occurring transactions; and the merchant information is stored in a merchant database, the merchant database being updated with updates relating to the merchant, the merchant database being updated using batch updating.

18. The method of claim 17, wherein the batch updating is performed monthly.

19. The method of claim 1, wherein the business information relates to at least one of average purchase amount per visit, average annual amount spent, frequency of customer visits, and revenue by zip code.

20. The method of claim 19, wherein the computer system is maintained and the process is effected by a banking institution.

21. The method of claim 1, wherein the processing the customer profile information and the merchant profile information in combination to generate business information further includes:

identifying particular merchant profile information associated with a requesting merchant;

determining at least one competitor merchant associated with a competitor merchant profile, based on comparing merchant profile information associated with various merchants against the merchant profile information of the requesting merchant;

applying the merchant profile information of the competitor merchant against the customer profile information to identify transaction purchase information related to the competitor merchant; and generating the business information based on the identified transaction purchase information.

22. The method of claim 21, wherein the business information relates to at least one of geographical distribution of market share, inventory expansion, customer demand and new store locations.

23. The method of claim 1, wherein the business information further includes further customer profile information.

24. The method of claim 1, further comprising a first entity, which maintains the computer system, sharing the transaction purchase information and the merchant information with a second entity, the second entity being a competitor of the first entity; and where the transaction purchase information and the merchant information is shared only as aggregated data such that specifics of such information is not shared.

25. The method of claim 1, wherein the merchant profile information includes:

store level profile information, which is information relating to individual stores; and enterprise level profile information, which is information relating to a collection of stores in an enterprise, the method including:

the step of aggregating the store level profile information to generate the enterprise level profile information.

26. The method of claim 25, wherein the step of aggregating the store level profile information to generate the enterprise level profile information includes using at least one selected from the group consisting of a Standard Industry Category (SIC) code and a Merchant Category Code (MCC).

27. The method of claim 1, wherein the transaction purchase information is generated based on activity associated with a private label card, the transaction purchase information including identification of a particular item that has been purchased, the identification of a particular item including.

28. The method of claim 1, wherein the processing the customer profile information and the merchant profile information in combination to generate business information further includes conducting a same day purchase analysis, the same day purchase analysis including:

segregating transaction purchase information so as to collect transaction purchase information from a single day; and performing the processing based on the transaction purchase information collected from the single day.

29. The method of claim 1, wherein the processing the customer profile information and the merchant profile information in combination to generate business information further includes:

selecting accounts with purchases at a client store to generate a set of selected accounts; and performing a further selection process on the set of selected accounts to retain only transactions on these accounts occurring on the same day, so as to build a same-day purchase database.

30. A computer system constituted by a processing machine for storing and manipulating transaction data including transaction purchase information and merchant information, the computer system comprising:

an account database for storing transaction purchase information, the account database inputting transaction purchase information generated from a plurality of sources;

a merchant database for storing merchant information, the merchant database inputting merchant information relating to at least one merchant;

a customer profile portion, disposed in the processing machine, that generates customer profile information based on the transaction purchase information;

a merchant profile portion, disposed in the processing machine, that generates merchant profile information based on the merchant information; and a processing portion, disposed in the processing machine, that processes the customer profile information and the merchant profile information in combination to generate business information;

wherein the business information includes at least one selected from the group consisting of merchant profit information, merchant bankruptcy information, merchant revenue, merchant profit projections, and merchant market share;

wherein the processing portion processes the customer profile information and the merchant profile information in combination to generate business information including:

analyzing the merchant profile information from a past time period, the merchant profile information being based on a selected merchant;

analyzing the customer profile information from the same past time period; and generating interrelationship information between the analyzed merchant profile information and customer profile information from the past period time, the interrelationship information defining an interrelationship between the analyzed merchant profile information and the analyzed customer profile information, wherein the processing the customer profile information and the merchant profile information in combination to generate business information, as performed by the processing portion, further includes:

identifying a subsequent time period, which occurs after the past time period;

analyzing customer profile information from the subsequent time period; and applying the interrelationship information in order to infer pseudo merchant profile information for the subsequent time period.

31. The system of claim 30, wherein the plurality of sources includes a plurality of databases.

32. The method of claim 30, wherein the processing portion processes the customer profile information and the merchant profile information in combination to generate business information further including:

identifying particular merchant profile information associated with a requesting merchant;

determining at least one competitor merchant associated with a competitor merchant profile, based on comparing merchant profile information associated with various merchants against the merchant profile information of the requesting merchant;

applying the merchant profile information of the competitor merchant against the customer profile information to identify transaction purchase information related to the competitor merchant; and generating the business information based on the identified transaction purchase information.

33. The system of claim 30, wherein:
the merchant profile information from a past time period relates to profits of the selected merchant in the past period of time; and
the pseudo merchant profile information for the subsequent time period relates to anticipated profits of the selected merchant in the subsequent period of time.

* * * * *